United States Patent
Backholm et al.

(10) Patent No.: US 10,136,441 B2
(45) Date of Patent: Nov. 20, 2018

(54) SYSTEMS AND METHODS OF BUFFERING APPLICATION DATA OPERABLE AT A DELIVERY CONTROL SERVER

(71) Applicant: Seven Networks, LLC, Marshall, TX (US)

(72) Inventors: Ari Backholm, Los Altos, CA (US); Michael Luna, San Jose, CA (US)

(73) Assignee: Seven Networks, LLC, Marshall, TX (US)

( * ) Notice: Subject to any disclaimer, the term of this patent is extended or adjusted under 35 U.S.C. 154(b) by 724 days.

(21) Appl. No.: 14/485,700

(22) Filed: Sep. 13, 2014

(65) Prior Publication Data

US 2015/0006666 A1  Jan. 1, 2015

Related U.S. Application Data

(63) Continuation of application No. 14/467,773, filed on Aug. 25, 2014, which is a continuation of application No. 13/178,675, filed on Jul. 8, 2011, now Pat. No. 9,077,630.

(60) Provisional application No. 61/430,828, filed on Jan. 7, 2011, provisional application No. 61/416,033, filed on Nov. 22, 2010, provisional application No. 61/416,020, filed on Nov. 22, 2010, provisional application No. 61/408,846, filed on Nov. 1, 2010, provisional application No. 61/408,854, filed on Nov.

(Continued)

(51) Int. Cl.
| | |
|---|---|
| *G06F 15/16* | (2006.01) |
| *H04W 72/04* | (2009.01) |
| *H04W 4/18* | (2009.01) |
| *H04L 29/08* | (2006.01) |
| *H04M 3/42* | (2006.01) |
| *H04W 24/02* | (2009.01) |

(52) U.S. Cl.
CPC .......... *H04W 72/048* (2013.01); *H04L 67/06* (2013.01); *H04L 67/1095* (2013.01); *H04L 67/289* (2013.01); *H04L 67/2833* (2013.01); *H04L 67/2842* (2013.01); *H04L 67/2847* (2013.01); *H04M 3/42178* (2013.01); *H04W 4/18* (2013.01); *H04W 24/02* (2013.01); *H04L 67/28* (2013.01); *H04L 67/2819* (2013.01); *H04L 67/32* (2013.01)

(58) Field of Classification Search
CPC .. H04W 4/18; H04L 67/2829; H04L 67/2842; H04L 67/28; H04L 67/2819
USPC ................ 709/202–203, 213–214, 217–219, 709/223–224

See application file for complete search history.

(56) References Cited

U.S. PATENT DOCUMENTS

| | | |
|---|---|---|
| 6,799,209 B1 | 9/2004 | Hayton |
| 7,062,567 B2 | 6/2006 | Benitez |

(Continued)

FOREIGN PATENT DOCUMENTS

| | | |
|---|---|---|
| WO | 2009070415 A1 | 6/2009 |
| WO | 2011067675 A2 | 6/2011 |

OTHER PUBLICATIONS

File history of U.S. Appl. No. 13/550,158 as of Dec. 11, 2014.

(Continued)

*Primary Examiner* — Bharat Barot
(74) *Attorney, Agent, or Firm* — NK Patent law

(57) ABSTRACT

A method of buffering application data operable at a delivery control server is provided. Related systems and computer program products are also provided.

22 Claims, 11 Drawing Sheets

Related U.S. Application Data 1, 2010, provisional application No. 61/408,858, filed on Nov. 1, 2010, provisional application No. 61/408,829, filed on Nov. 1, 2010, provisional application No. 61/408,826, filed on Nov. 1, 2010, provisional application No. 61/408,820, filed on Nov. 1, 2010, provisional application No. 61/408,839, filed on Nov. 1, 2010, provisional application No. 61/367,870, filed on Jul. 26, 2010, provisional application No. 61/367,871, filed on Jul. 26, 2010.

(56) References Cited

U.S. PATENT DOCUMENTS

| | | | |
|---|---|---|---|
| 8,036,718 | B2 | 10/2011 | Lencevicius et al. |
| 8,126,963 | B1* | 2/2012 | Rimmer ............... H04W 4/60 |
| | | | 709/203 |
| 8,185,165 | B2 | 5/2012 | Beninghausr |
| 8,284,706 | B2 | 10/2012 | Ulipinar |
| 8,289,891 | B2 | 10/2012 | Ji |
| 8,520,694 | B1 | 8/2013 | Bali |
| 8,688,826 | B2 | 4/2014 | Black |
| 8,750,123 | B1 | 6/2014 | Alisawi |
| 8,862,416 | B2 | 10/2014 | Black |
| 8,904,206 | B2 | 12/2014 | Black |
| 9,026,664 | B2* | 5/2015 | Zarka ............... H04L 67/2833 |
| | | | 709/227 |
| 9,380,125 | B2* | 6/2016 | Soliman ........... H04L 67/2819 |
| 9,432,455 | B2* | 8/2016 | Jeide ............... H04L 67/1095 |
| 9,503,544 | B2 | 11/2016 | Luna |
| 2003/0123422 | A1 | 7/2003 | Miya |
| 2004/0125800 | A1 | 7/2004 | Zellner |
| 2005/0027791 | A1 | 2/2005 | Bos et al. |
| 2005/0083961 | A1* | 4/2005 | Pecen ................. H04W 4/06 |
| | | | 370/432 |
| 2006/0233183 | A1 | 10/2006 | Soncodi |
| 2007/0073766 | A1 | 3/2007 | Porter |
| 2007/0260718 | A1 | 11/2007 | Shenfield |
| 2008/0096505 | A1 | 4/2008 | Martinez et al. |
| 2008/0242370 | A1 | 10/2008 | Lando et al. |
| 2008/0299894 | A1 | 12/2008 | Natori et al. |
| 2009/0011791 | A1 | 1/2009 | Tashiro |
| 2009/0055467 | A1 | 2/2009 | Petersen |
| 2009/0082699 | A1 | 3/2009 | Bang et al. |
| 2009/0093281 | A1 | 4/2009 | Demirhan et al. |
| 2009/0124284 | A1* | 5/2009 | Scherzer ........... H04W 48/18 |
| | | | 455/552.1 |
| 2009/0125230 | A1* | 5/2009 | Sullivan ........... G06F 17/3087 |
| | | | 701/408 |
| 2010/0250986 | A1 | 9/2010 | Black et al. |
| 2010/0299455 | A1 | 11/2010 | Master et al. |
| 2010/0304794 | A1 | 12/2010 | Beninghaus et al. |
| 2010/0322124 | A1 | 12/2010 | Luoma et al. |
| 2011/0047285 | A1 | 2/2011 | Kampmann et al. |
| 2011/0131321 | A1 | 6/2011 | Black et al. |
| 2011/0177847 | A1 | 7/2011 | Huang |
| 2011/0238496 | A1* | 9/2011 | Gurbuxani ........... G06Q 30/02 |
| | | | 709/217 |
| 2012/0023226 | A1 | 1/2012 | Petersen et al. |
| 2012/0023236 | A1 | 1/2012 | Backholm et al. |
| 2012/0210415 | A1 | 8/2012 | Somani et al. |
| 2012/0303774 | A1 | 11/2012 | Wilson et al. |
| 2013/0086202 | A1 | 4/2013 | Connelly et al. |
| 2014/0074907 | A1 | 3/2014 | Soliman |
| 2014/0075472 | A1 | 3/2014 | Mitsuya et al. |
| 2015/0143456 | A1 | 5/2015 | Raleigh et al. |
| 2015/0188826 | A1 | 7/2015 | Thodupunoori et al. |

OTHER PUBLICATIONS

WIPO, International Search Report and Written Opinion for PCT/US2013/058948 dated Mar. 3, 2014.

USPTO, Notice of Allowance in U.S. Appl. No. 14/748,226 dated Nov. 29, 2017.

USPTO, non-Final Rejection in U.S. Appl. No. 14/467,773 dated Nov. 30, 2017.

EPO, European Search Report in European Patent Application No. 18150556.1 dated May 28, 2018.

Latedroid, "JuiceDefender," Jan. 19, 2010, and comments posted on Feb. 14, 16, and 17, 2010, available at https://web.archive.org/web/20100221214647/http://www.latedroid.com/2010/01/juicedefender.html.

Latedroid, "JuiceDefender," https://web.archive.org/web/20100405223340/http://www.latedroid.com/2010/01/juicedefender.html (archived Apr. 5, 2010) ("Latedroid").

Latedroid, "JuiceDefender FAQ," Feb. 9, 2010, available at https://web.archive.org/web/20100223104054/http://www.latedroid.com/2010/02/juicedefender-faq.html (archived Feb. 23, 2010) ("Latedroid FAQ").

Kevin Purdy, "JuiceDefender Saves Batteries by Automating Android Data," Mar. 1, 2010, available at https://web.archive.org/web/20100304152811/http://lifehacker.com:80/5482663/juicedefender-saves-batteries-by-automating-android-data ("Prudy").

David Ruddock, "8 Great Apps Every Rooted Android User Should Know About," Jul. 13, 2010, available at https://web.archive.org/web/20100718234639/http://www.androidpolice.com/2010/07/13/8-great-apps-every-rooted-android-user-should-know-about/ (archived Jul. 18, 2010) ("Ruddock").

"Configuración de Juice Defender y Ultimate Juiced," Jul. 1, 2010, available at https://web.archive.org/web/20100706051635/http://android.scenebeta.com/tutorial/configuracion-de-juice-defender-y-ultimate-juiced (archived Jul. 6, 2010) ("Configuration").

"Android 2.0 Platform Highlights," available at https://web.archive.org/web/20091029032030/http://developer.android.com/intl/zh-CN/sdk/android-2.0-highlights.html (archived Oct. 29, 2009) ("Android 2.0").

"Android 2.2 Platform Highlights," available at https://web.archive.org/web/20100522075056/http://developer.android.com/sdk/android-2.2-highlights.html (archived May 22, 2010) ("Android 2.2").

"Android Cloud to Device Messaging Framework," available at https://web.archive.org/web/20100523074155/https://code.google.com/android/c2dm/index.html (archived May 23, 2010) ("C2DM").

Wei Huang, "Android Cloud to Device Messaging," available at https://web.archive.org/web/20100530062514/http://android-developers.blogspot.com/2010/05/android-cloud-to-device-messaging.html (archived May 30, 2010) ("Huang").

Kevin Purdy, "An Exhaustive Guide to Saving Your Smartphone's Battery," Oct. 6, 2009, available at https://web.archive.org/web/20091021200800/https://lifehacker.com/5375325/an-exhaustive-guide-to-saving-your-smartphones-battery (archived Oct. 21, 2009) ("Exhaustive Guide").

"Droid Battery Life Tips and Tricks," Dec. 16, 2009, available at https://web.archive.org/web/20100218152255/http://www.thedroidgeek.com/2009/12/droid-batter-life-tips-and¬tricks.html (archived Feb. 18, 2010) ("Droid").

Jason Perlow, "Stupid DROID Tricks, vol. 1," available at https://web.archive.org/web/20100515153155/http://www.zdnet.com/blog/perlow/stupid-droid-tricks-volume-1/11625?p=11625 (archived May 15, 2010) ("Perlow").

"Save Power with the Droid's Power Control Widget," Jan. 19, 2010, available at https://www.youtube.com/watch?v=fos-SGStYRGw ("Power Control Widget Video").

Dianne Hackbom, "Multitasking the Android Way," Apr. 28, 2010, available at https://web.archive.org/web/20100502143906/http://android-developers.blogspot.com/2010/04/multitasking-android¬way.html (archived May 2, 2010) ("Hackborn").

Matt Buchanan,"Giz Explains: How Multitasking Works on a Phone," Apr. 29, 2010, available at https://web.archive.org/web/20100501123852/https://gizmodo.com/5527407/giz-explains-how-multitasking-works-on¬a-phone (archived May 1, 2010) ("Buchanan").

David Quintana, "Mobile Multitasking," Apr. 14, 2010, available at https://web.archive.org/web/20100417073433/http://davidquintana.com/entry/mobile-multitasking/ (archived Apr. 17, 2010) ("Quintana").

"Application Fundamentals," available at https://web.archive.org/web/20090213153037/http://developer.android.com:80/guide/topics/fundamentals.html (archived Feb. 13, 2009) ("Application").

(56) References Cited

OTHER PUBLICATIONS

App Log, "Green Power Android App Review," Oct. 25, 2012, available at https://web.archive.org/web/20121102013813/http://www.androidapplog.com/2012/10/android-app-reviews/green-power-saver-for-android/ (archived Nov. 2, 2012) ("App Log").
USPTO, non-Final Rejection in U.S. Appl. No. 15/595,104 dated Aug. 11, 2017.
USPTO, Final Rejection in U.S. Appl. No. 14/748,226 dated Jul. 7, 2017.
Vogel, Lars, http://www.vogella.com/tutorials/GoogleCloudMessaging/article.html, last accessed May 3, 2017.
Meir, Reto, Professional Android 4 Application Development, 2012.
USPTO, Information Disclosure Statement dated Sep. 27, 2018 for U.S. Appl. No. 16/046,960.
USPTO, Information Disclosure Statement dated Sep. 26, 2018 for U.S. Appl. No. 16/046,960.

\* cited by examiner

SYSTEMS AND METHODS OF BUFFERING APPLICATION DATA OPERABLE AT A DELIVERY CONTROL SERVER

CROSS-REFERENCE TO RELATED APPLICATIONS

This application is a continuation application of U.S. patent application Ser. No. 13/178,675 entitled "DISTRIBUTED IMPLEMENTATION OF DYNAMIC WIRELESS TRAFFIC POLICY", which filed on Jul. 8, 2011, and claims the benefit of U.S. Provisional Patent Application No. 61/367,871 entitled "CONSERVING POWER CONSUMPTION IN APPLICATIONS WITH NETWORK INITIATED DATA TRANSFER FUNCTIONALITY", which was filed on Jul. 26, 2010, U.S. Provisional Patent Application No. 61/367,870 entitled "MANAGING AND IMPROVING NETWORK RESOURCE UTILIZATION, PERFORMANCE AND OPTIMIZING TRAFFIC IN WIRE LINE AND WIRELESS NETWORKS WITH MOBILE CLIENTS", which was filed on Jul. 26, 2010, U.S. Provisional Patent Application No. 61/408,858 entitled "CROSS APPLICATION TRAFFIC COORDINATION", which was filed on Nov. 1, 2010, U.S. Provisional Patent Application No. 61/408,839 entitled "ACTIVITY SESSION AS METHOD OF OPTIMIZING NETWORK RESOURCE USE", which was filed on Nov. 1, 2010, U.S. Provisional Patent Application No. 61/408,829 entitled "DISTRIBUTED POLICY MANAGEMENT", which was filed on Nov. 1, 2010, U.S. Provisional Patent Application No. 61/408,846 entitled "INTELLIGENT CACHE MANAGEMENT IN CONGESTED WIRELESS NETWORKS", which was filed on Nov. 1, 2010, U.S. Provisional Patent Application No. 61/408,854 entitled "INTELLIGENT MANAGEMENT OF NON-CACHEABLE CONTENT IN WIRELESS NETWORKS", which was filed on Nov. 1, 2010, U.S. Provisional Patent Application No. 61/408,826 entitled "ONE WAY INTELLIGENT HEARTBEAT", which was filed on Nov. 1, 2010, U.S. Provisional Patent Application No. 61/408,820 entitled "TRAFFIC CATEGORIZATION AND POLICY DRIVING RADIO STATE", which was filed on Nov. 1, 2010, U.S. Provisional Patent Application No. 61/416,020 entitled "ALIGNING BURSTS FROM SERVER TO CLIENT", which was filed on Nov. 22, 2010, U.S. Provisional Patent Application No. 61/416,033 entitled "POLLING INTERVAL FUNCTIONS", which was filed on Nov. 22, 2010, U.S. Provisional Patent Application No. 61/430,828 entitled "DOMAIN NAME SYSTEM WITH NETWORK TRAFFIC HARMONIZATION", which was filed on Jan. 7, 2011, the contents of which are all incorporated by reference herein.

BACKGROUND

When WCDMA was specified, there was little attention to requirements posed by applications whose functions are based on actions initiated by the network, in contrast to functions initiated by the user or by the device. Such applications include, for example, push email, instant messaging, visual voicemail and voice and video telephony, and others. Such applications typically require an always-on IP connection and frequent transmit of small bits of data. WCDMA networks are designed and optimized for high-throughput of large amounts of data, not for applications that require frequent, but low-throughput and/or small amounts of data. Each transaction puts the mobile device radio in a high power mode for considerable length of time—typically between 15-30 seconds. As the high power mode can consume as much as 100× the power as an idle mode, these network-initiated applications quickly drain battery in WCDMA networks. The issue has been exacerbated by the rapid increase of popularity of applications with network-initiated functionalities, such as push email.

Lack of proper support has prompted a number of vendors to provide documents to guide their operator partners and independent software vendors to configure their networks and applications to perform better in WCDMA networks. This guidance focuses on: configuring networks to go to stay on high-power radio mode as short as possible and making periodic keep alive messages that are used to maintain an always-on TCP/IP connection as infrequent as possible. Such solutions typically assume lack of coordination between the user, the application and the network.

Furthermore, in general, mobile application usage is sporadic in nature. For example, there can be periods of user inactivity (e.g., during working hours or when the user is sleeping) followed by periods of multiple application usage, such as where a user is updating their Facebook status, sending a Tweet, checking their email, and using other applications to get an update of their online information. This doesn't mean, however, that the mobile device is inactive during user inactivity: the device may be actively downloading new content such as advertisements, polling for email, and receiving push notifications for activities on the Internet, thus utilizing occupying network bandwidth and consuming device power even when the user is not interacting with the mobile device or otherwise expecting data.

DETAILED DESCRIPTION

Figure 1A:
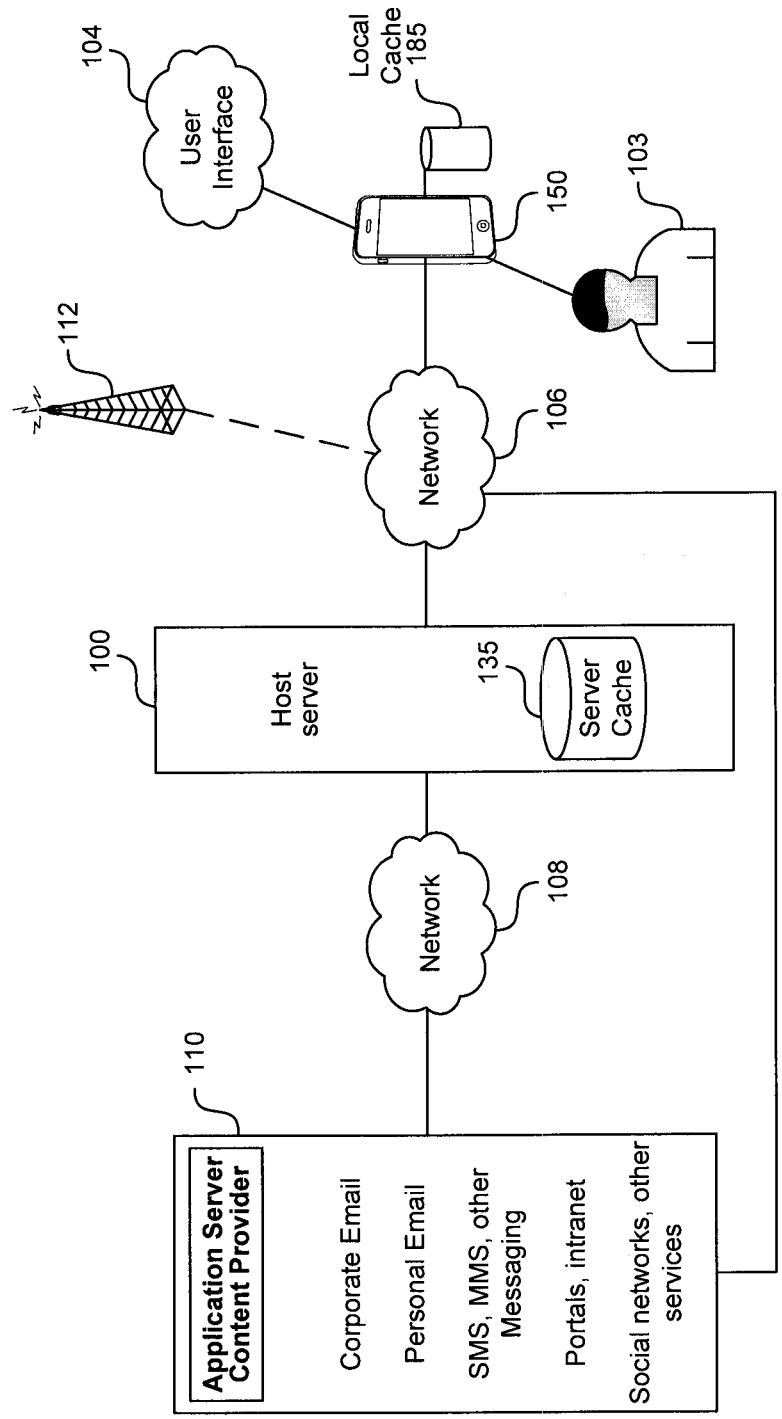
FIG. 1A illustrates an example diagram of a system where a host server facilitates management of traffic between client devices and an application server or content provider in a wireless network for resource conservation.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

The massive growth in mobile data, largely resulting from mass of smart phones and tablets, has introduced new challenges to mobile network operators in the way that the surge in data is managed and supported the surge in data. With total spending near exceeding billions of dollars on network improvements alone, operators are working hard to make their networks faster, smarter and more efficient. Most of the existing solutions on the market to improve network performance deal with only one aspect of the problem—increasing the size and scope of the networks.

As mobile media explodes and end-users turn to their portable devices to view and share videos, music, and applications, the pressure for bigger, faster networks has grown. Although increasing the size/scope of physical networks addresses the need for 'bigger pipes' to transport more data, it does not take into account the type of data being shared. For example, bandwidth addresses mobile video applications, but fails to take into account the vast array of other mobile applications and end-user behavior. Many factors contribute to the massive growth in data including more sophisticated devices, end-user behavior, and advanced mobile applications—all contributing to an enormous amount of data traffic.

Device manufacturers are also experiencing increased challenges as a result of this trend. With increasingly sophisticated devices, challenges with limited battery life are driven by end-users accessing multiple applications simultaneously and devices constantly accessing the network. Smart phones and the 'always on', chatty mobile applications receive frequent updates and regularly poll the network. These constant requests cause the device battery to drain rapidly. Some approaches seek to address this issue by rapidly disconnecting from the network once updates are sent or received. While fast dormancy succeeds in improving battery life, it puts a heavy load on mobile networks.

The frequent and constant connections and disconnections increase the amount of signaling traffic, which lowers the performance of the network overall again placing additional pressure on the mobile network operators and forcing additional capital investment to increase bandwidth and network access. Although more sophisticated versions of fast dormancy have been developed to address the device battery and network congestion issues, these solutions fail to take into account all the elements that are contributing to the mobile data tsunami.

There are multiple factors that contribute to the proliferation of data. Some of these factors include, for example: the end-user, mobile devices, mobile applications, mobile services, and the network. As mobile devices evolve, so do the various associated elements, for example, availability, applications, services, user behavior, location-changing the way the mobile network interacts or needs to be interacting with the device and the application.

One embodiment of the disclosed technology includes, a system that optimizes multiple aspects of the connection with wired and wireless networks and devices through a comprehensive view of device and application activity including: loading, current application needs on a device, controlling the type of access (push vs. pull or hybrid), location, concentration of users in a single area, time of day, how often the user interacts with the application, content or device, and using this information to shape traffic to a cooperative client/server or simultaneously mobile devices without a cooperative client. Because the disclosed server is not tied to any specific network provider it has visibility into the network performance across all service providers. This enables optimizations to be applied to devices regardless of the operator or service provider, thereby enhancing the user experience and managing network utilization while roaming. Bandwidth has been considered a major issue in wireless networks today. More and more research has been done related to the need for additional bandwidth to solve access problems—many of the performance enhancing solutions and next generation standards, such as those commonly referred to as 4G, namely LTE, 4G, and WiMAX are focused on providing increased bandwidth. Although partially addressed by the standards a key problem that remains is lack of bandwidth on the signaling channel more so than the data channel.

Embodiments of the disclosed technology includes, for example, alignment of requests from multiple applications to minimize the need for several polling requests; leverage specific content types to determine how to proxy/manage a connection/content; and apply specific heuristics associated with device, user behavioral patterns (how often they interact with the device/application) and/or network parameters.

Embodiments of the present technology can further include, moving recurring HTTP polls performed by various widgets, RSS readers, etc., to remote network node (e.g., Network operation center (NOC)), thus considerably lowering device battery/power consumption, radio channel signaling, and bandwidth usage. Additionally, the offloading can be performed transparently so that existing applications do not need to be changed.

In some embodiments, this can be implemented using a local proxy on the mobile device which automatically detects recurring requests for the same content (RSS feed, Widget data set) that matches a specific rule (e.g. happens every 15 minutes). The local proxy can automatically cache the content on the mobile device while delegating the polling to the server (e.g., a proxy server operated as an element of a communications network). The server can then notify the mobile/client proxy if the content changes, and if content has not changed (or not changed sufficiently, or in an identified manner or amount) the mobile proxy provides the latest version in its cache to the user (without need to utilize the radio at all). This way the mobile device (e.g., a mobile phone, smart phone, etc.) does not need to open up (e.g., thus powering on the radio) or use a data connection if the request is for content that is monitored and that has been not flagged as new/changed.

The logic for automatically adding content sources/application servers (e.g., including URLs/content) to be monitored can also check for various factors like how often the content is the same, how often the same request is made (is there a fixed interval/pattern?), which application is requesting the data, etc. Similar rules to decide between using the cache and request the data from the original source may also be implemented and executed by the local proxy and/or server.

For example, when the request comes at an unscheduled/unexpected time (user initiated check), or after every (n) consecutive times the response has been provided from the cache, etc., or if the application is running in the background vs. in a more interactive mode of the foreground. As more and more mobile applications base their features on resources available in the network, this becomes increasingly important. In addition, the disclosed technology allows elimination of unnecessary chatter from the network, benefiting the operators trying to optimize the wireless spectrum usage.

Embodiments of the present disclosure further include systems and methods for distributed implementation of dynamic wireless traffic policy. The described technology provides an end-to-end solution that addresses the contributing factors and elements in whole, for operators and devices manufacturers to successfully support both the shift in mobile devices and the surge in data.

Distributed Policy Management

Embodiments of the present disclosure allow a local proxy (e.g., local proxy 175 or 275 in the examples of FIG. 1B and FIG. 2A respectively) in the mobile device (e.g., device 150 in FIG. 1A-B) and the proxy server (e.g., proxy server 125 or 325 in the examples of FIG. 1B and FIG. 3A respectively), the components that are on each side of the network hop (e.g., the wireless network 106 of FIG. 1A-B) to share information to optimize the traffic (e.g., the transfer of traffic such as messages or data) in this network hop. As examples, the local proxy and/or the proxy server can generate, monitor, or transfer one or more of the network and operational parameters (or information about such characteristics) described below in order to implement, optimize, adjust, or refine policy:

(1) Client-Side Parameters/Functions
   a. Application parameters
      i. Applications installed in the device
      ii. Application status: foreground state (e.g., in foreground, not in foreground)
      iii. Application traffic profile (polling rates, protocols used, amount of data; background activities vs. user interactions)
   b. Activity within the portfolio of applications installed on the device (to enable coordination of activity between applications, e.g., delay/accelerate content transfer for certain applications)
   c. Device parameters
      i. User activity status (for example, as determined through backlight state, motion detector, light sensor, cursor activity, etc.)
      ii. Network availability, network strength (to avoid excessive reconnect attempts when network strength is low, for example)
      iii. Current radio state of each wireless radio (Bluetooth, Wifi, cellular, etc.)
   d. Sending the traffic profile to the server as an adjunct (piggybacking) on payload data; if no payload is sent, upload profile every (X) hours; also, use the profile upload to send usage statistics that the server can use for analytics and reporting purposes.

(2) Server-Side Parameters/Functions
   a. Location of the device (based on infrastructure data, GPS, etc.)
   b. Other devices presently in the same general location (in congested areas, may use to slow down traffic or ask devices to switch to alternative bearers or carriers), the activity profiles of other users
   c. Content changes at the content host(s)
   d. Final decisions regarding the profile based on input from multiple devices In operation, implementations of the disclosed technology can include a local proxy on a mobile device and/or a proxy server on a remote host server monitoring operations, collecting status information, parameters, or data and communicating that information or data between the local proxy and proxy server in order to formulate, optimize, enhance, or dynamically update and refine, a policy for management of the traffic communicated over the network (cellular or others).

Some examples of use cases and implementation of the technology as described as follows:

1) Local proxy (e.g., local proxy 175 or 275 in the examples of FIG. 1B and FIG. 2A respectively) on a mobile device detects the applications installed in the device and the respective polling frequencies which can be communicated to the proxy server (e.g., proxy server 125 or 325 in the examples of FIG. 1B and FIG. 3A respectively) on a host server (e.g., the host server 100 or 300). The proxy server can determine whether other mobile devices are making similar requests (within a certain time frame, for example) and can combine the content polls (for the host servers) to serve multiple mobile devices simultaneously;

(2) When the proxy server determines that mobile devices sharing the same network cell (or other network area) are failing to connect to a wireless network (e.g., for longer than a specified time period), or another measure of network congestion or operational difficulties, such as initiating multiple connection attempts, or the server detects throughput rates lower than a threshold amount (e.g., the average rate or another rate), the proxy server can reduce the polling frequency for content changes for all application servers/content providers (e.g., app server/provider 110 in FIG. 1A-1B) that are being polled for all or some of the mobile devices.

Note that additional criteria may be employed. For example, mobile devices with specific data plans may be allowed to operate differently than others) in the affected cell or other network area, for either all applications or for applications matching a specific criteria (e.g. where application profile is "background" or "low priority");

a. Additional criteria may be employed: for example, traffic shaping can be implemented based on whether the proxy server observes either a certain number of mobile devices in the same cell or other network area, or otherwise (for example, through integration with the network infrastructure) is made aware that the mobile devices that it is monitoring and managing includes more than a certain portion of mobile devices in the same network cell.

b. The proxy server can communicate to (the local proxies of) the mobile devices in the affected area to reduce the frequency of reconnection attempts and present user(s) with connection failures even without attempting the connection in order to conserve signaling bandwidth.

c. The proxy server communicate specific schedule for polling to local proxies or mobile devices—for example by communicating a different schedule to different devices, to avoid congestion.

(3) A local proxy can detect and identify the applications installed in the device and the respective polling frequencies. The local proxy can communicate this information to the proxy server. The proxy server can observe the frequency of how often polls of application servers/content providers finds new/changed data (e.g., how frequently the content at the source changes) and can create a probability profile for the application (e.g., as an indicator to predict whether an upcoming poll is likely to find new data). Using criteria that is either predetermined or based on a request from the proxy server, the local proxy may not retrieve the new content to its cache from the proxy server immediately when the server signals content change on the application server/content provider, but instead combines multiple polls to be performed simultaneously.

a. The local proxy can accelerate the timing of a poll for an application, for example, if poll for another application is about to happen because there is new data, and the probability for finding new data for the application in question is higher than a certain percentage; the proxy server can adjust this percentage based on network considerations such as congestion or other operational difficulties as described in (2) above. The local proxy can communicate to the proxy server that such an accelerated poll happened so that the proxy server can skip the next poll.

b. The local proxy can delay a poll for an application even if the proxy server has signaled new data availability, for example, if another application is about to poll within a certain time frame (server may adjust this based on (2) above) and the probability to find new data for this second application is higher than a threshold percentage; the server can also adjust this percentage based on congestion considerations as in (2) above.

FIG. 1A illustrates an example diagram of a system where a host server 100 facilitates management of traffic between client devices 102 and an application server or content provider 110 in a wireless network for resource conservation.

The client devices 102A-D can be any system and/or device, and/or any combination of devices/systems that is able to establish a connection, including wired, wireless, cellular connections with another device, a server and/or other systems such as host server 100 and/or application server/content provider 110. Client devices 102 will typically include a display and/or other output functionalities to present information and data exchanged between among the devices 102 and/or the host server 100 and/or application server/content provider 110.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Palm device, a handheld tablet (e.g. an iPad or any other tablet), a hand held console, a hand held gaming device or console, any Super-Phone such as the iPhone, and/or any other portable, mobile, hand held devices, etc. In one embodiment, the client devices 102, host server 100, and app server 110 are coupled via a network 106 and/or a network 108. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology in acquiring context awareness at the client device 102. Context awareness at client devices 102 generally includes, by way of example but not limitation, client device 102 operation or state acknowledgement, management, user activity/behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cell provider 112 and/or Internet service providers) of the network 106 and/or network 108 (e.g., by the host server and/or devices 102). In addition to application context awareness as determined from the client 102 side, the application context awareness may also be received from or obtained/queried from the respective application/service providers 110 (by the host 100 and/or client devices 102).

The host server 100 can use, for example, contextual information obtained for client devices 102, networks 106/108, applications (e.g., mobile applications), application server/provider 110, or any combination of the above, to manage the traffic in the system to satisfy data needs of the client devices 102 (e.g., to satisfy application or any other request including HTTP request). In one embodiment, the traffic is managed by the host server 100 to satisfy data requests made in response to explicit or non-explicit user 103 requests and/or device/application maintenance tasks. The traffic can be managed such that network consumption, for example, use of the cellular network is conserved for effective and efficient bandwidth utilization. In addition, the host server 100 can manage and coordinate such traffic in the system such that use of device 102 side resources (e.g., including but not limited to battery power consumption, radio use, processor/memory use) are optimized with a general philosophy for resource conservation while still optimizing performance and user experience.

For example, in context of battery conservation, the device 150 can observe user activity (for example, by observing user keystrokes, backlight status, or other signals via one or more input mechanisms, etc.) and alters device 102 behaviors. The device 150 can also request the host server 100 to alter the behavior for network resource consumption based on user activity or behavior.

In one embodiment, the traffic management for resource conservation is performed using a distributed system between the host server 100 and client device 102. The distributed system can include proxy server and cache components on the server 100 side and on the client 102 side, for example, as shown by the server cache 135 on the server 100 side and the local cache 150 on the client 102 side.

Functions and techniques disclosed for context aware traffic management for resource conservation in networks (e.g., network 106 and/or 108) and devices 102, reside in a distributed proxy and cache system. The proxy and cache system can be distributed between, and reside on, a given client device 102 in part or in whole and/or host server 100 in part or in whole. The distributed proxy and cache system are illustrated with further reference to the example diagram shown in FIG. 1B. Functions and techniques performed by the proxy and cache components in the client device 102, the host server 100, and the related components therein are described, respectively, in detail with further reference to the examples of FIG. 2-3.

In one embodiment, client devices 102 communicate with the host server 100 and/or the application server 110 over network 106, which can be a cellular network. To facilitate overall traffic management between devices 102 and various application servers/content providers 110 to implement network (bandwidth utilization) and device resource (e.g., battery consumption), the host server 100 can communicate with the application server/providers 110 over the network 108, which can include the Internet.

In general, the networks 106 and/or 108, over which the client devices 102, the host server 100, and/or application server 110 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, Open System Interconnections (OSI), FTP, UPnP, iSCSI, NSF, ISDN, PDH, RS-232, SDH, SONET, etc.

The networks 106 and/or 108 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

Figure 1B:
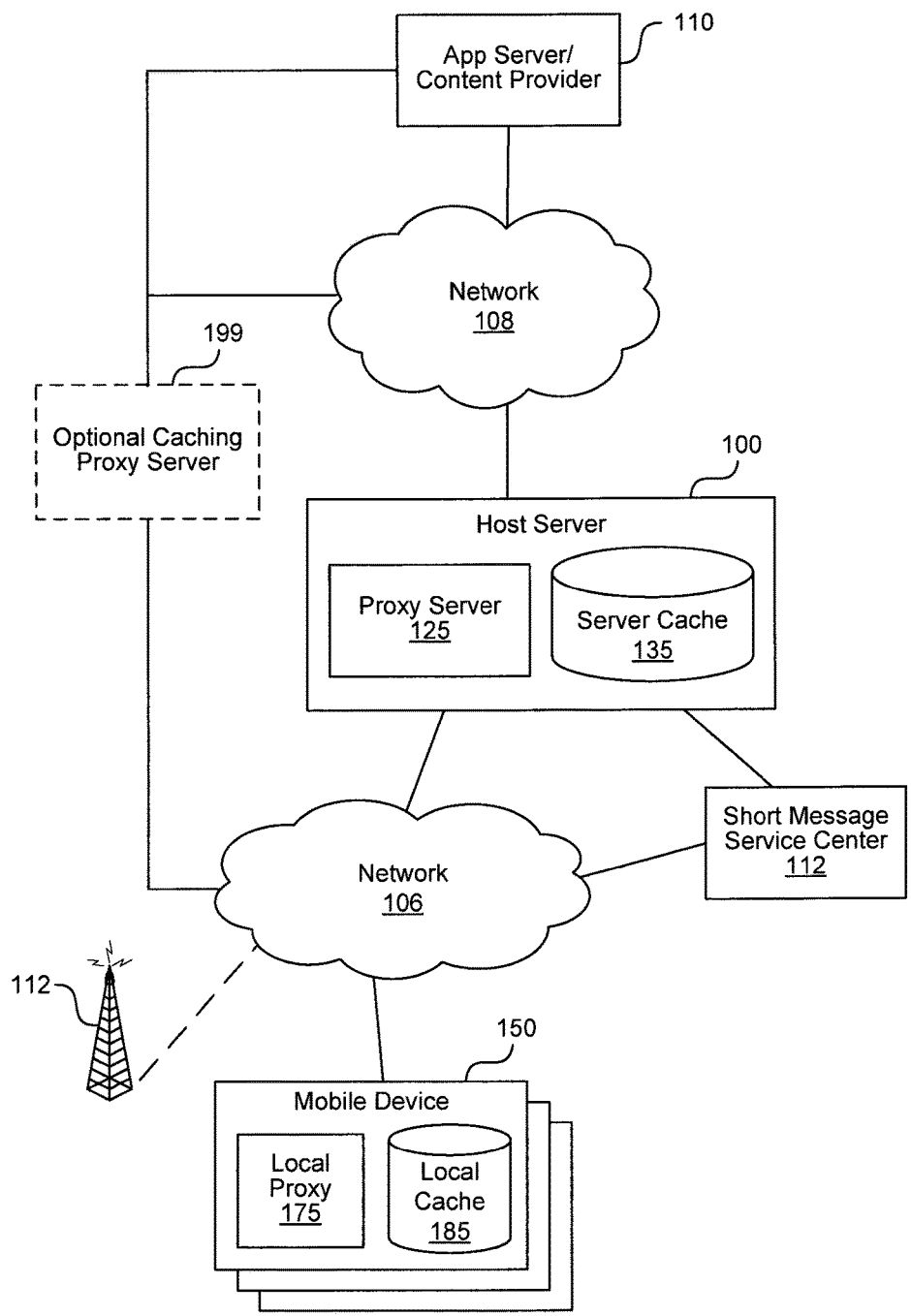
FIG. 1B illustrates an example diagram of a proxy and cache system distributed between the host server and device which facilitates network traffic management between a device and an application server/content provider for resource conservation.

FIG. 1B illustrates an example diagram of a proxy and cache system distributed between the host server 100 and device 150 which facilitates network traffic management between the device 150 and an application server/content provider 100 (e.g., a source server) for resource conservation.

The distributed proxy and cache system can include, for example, the proxy server 125 (e.g., remote proxy) and the server cache, 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100.

The distributed system can also, include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider 112, and or any combination of the above to facilitate network traffic management for network and device resource conservation. Proxy server 199 can be used, for example, for caching content to be provided to the device 150, for example, from one or more of, the application server/provider 110, host server 100, and/or a network service provider 112. Content caching can also be entirely or partially performed by the remote proxy 125 to satisfy application requests or other data requests at the device 150.

In context aware traffic management and optimization for resource conservation in a network (e.g., cellular or other wireless networks), characteristics of user activity/behavior and/or application behavior at a mobile device 150 can be tracked by the local proxy 175 and communicated, over the network 106 to the proxy server 125 component in the host server 100, for example, as connection metadata. The proxy server 125 which in turn is coupled to the application server/provider 110 provides content and data to satisfy requests made at the device 150.

In addition, the local proxy 175 can identify and retrieve mobile device properties including, one or more of, battery level, network that the device is registered on, radio state, whether the mobile device is being used (e.g., interacted with by a user). In some instances, the local proxy 175 can delay, expedite (prefetch), and/or modify data prior to transmission to the proxy server 125, when appropriate, as will be further detailed with references to the description associated with the examples of FIG. 2-3.

The local database 185 can be included in the local proxy 175 or coupled to the proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the app server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices.

In general, the local proxy 175 and the proxy server 125 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, into a firewall, and/or a router.

In one embodiment, the host server 100 can in some instances, utilize the store and forward functions of a short message service center (SMSC) 112, such as that provided by the network service provider 112, in communicating with the device 150 in achieving network traffic management. As will be further described with reference to the example of FIG. 3, the host server 100 can forward content or HTTP responses to the SMSC 112 such that it is automatically forwarded to the device 150 if available, and for subsequent forwarding if the device 150 is not currently available.

In general, the disclosed distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 and the proxy server 125 can also accumulate low priority data and send it in batches to avoid the protocol overhead of sending individual data fragments. The local proxy 175 and the proxy server 125 can also compress or transcode the traffic, reducing the amount of data sent over the network 106 and/or 108. The signaling traffic in the network 106 and/or 108 can be reduced, as the networks are now used less often and the network traffic can be synchronized among individual applications.

With respect to the battery life of the mobile device 150, by serving application or content requests from the local cache 185, the local proxy 175 can reduce the number of times the radio module is powered up. The local proxy 175 and the proxy server 125 can work in conjunction to accumulate low priority data and send it in batches to reduce the number of times and/or amount of time when the radio is powered up. The local proxy 175 can synchronize the network use by performing the batched data transfer for all connections simultaneously.

Figure 2A:
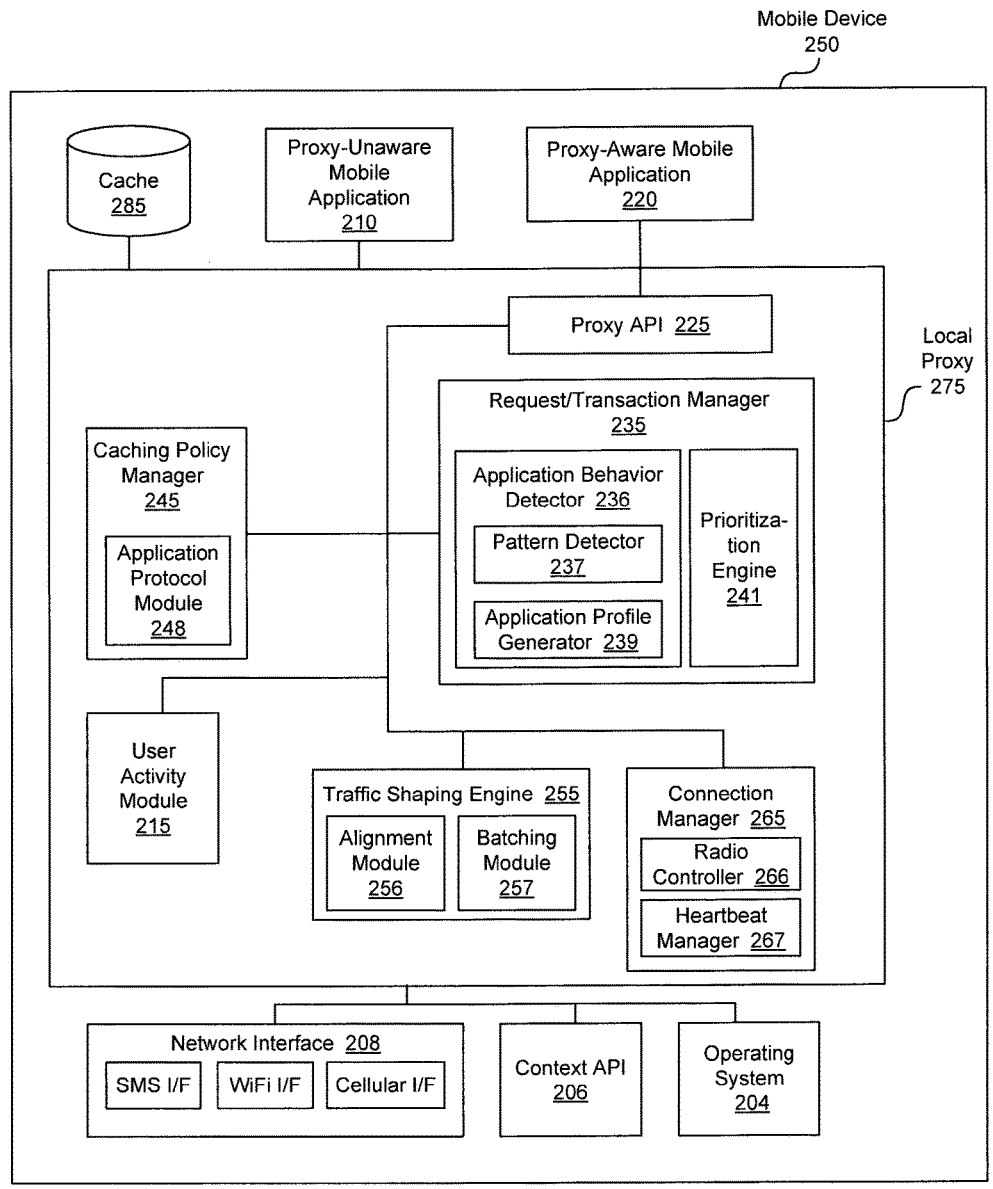
FIG. 2A depicts a block diagram illustrating an example of client-side components in a distributed proxy and cache system residing on a mobile device that manages traffic in a wireless network for resource conservation.

FIG. 2A depicts a block diagram illustrating an example of client-side components in a distributed proxy and cache system residing on a device 250 that manages traffic in a wireless network for resource conservation.

The device 250, which can be a portable or mobile device, such as a portable phone, generally includes, for example, a network interface 208, an operating system 204, a context API 206, and mobile applications which may be proxy unaware 210 or proxy aware 220. Note that the device 250 is specifically illustrated in the example of FIG. 2 as a mobile device, such is not a limitation and that device 250 may be any portable/mobile or non-portable device able to receive, transmit signals to satisfy data requests over a network including wired or wireless networks (e.g., WiFi, cellular, Bluetooth, etc.).

The network interface 208 can be a networking module that enables the device 250 to mediate data in a network with an entity that is external to the host server 250, through any known and/or convenient communications protocol supported by the host and the external entity. The network interface 208 can include one or more of a network adaptor card, a wireless network interface card (e.g., SMS interface, WiFi interface, interfaces for various generations of mobile communication standards including but not limited to 2G, 3G, 3.5G, 4G, LTE, etc.,), Bluetooth, or whether or not the connection is via a router, an access point, a wireless router, a switch, a multilayer switch, a protocol converter, a gateway, a bridge, bridge router, a hub, a digital media receiver, and/or a repeater.

Device 250 can further include, client-side components of the distributed proxy and cache system which can include, a local proxy 275 (e.g., a mobile client of a mobile device) and a cache 285. In one embodiment, the local proxy 275 includes a user activity module 215, a proxy API 225, a request/transaction manager 235, a caching policy manager 245, a traffic shaping engine 255, and/or a connection manager 265. The traffic shaping engine 255 may further include an alignment module 256 and/or a batching module 257, the connection manager 265 may further include a radio controller 266. The request/transaction manager 235 can further include an application behavior detector 236 and/or a prioritization engine 238, the application behavior detector 236 may further include a pattern detector 237 and/or and application profile generator 238. Additional or less components/modules/engines can be included in the local proxy 275 and each illustrated component.

As used herein and as used with the description of any other applicable components shown in the figures accompanying the present disclosure, a "module," "a manager," a "handler," a "detector," an "interface," an "identifier," or an "engine" can include a general purpose, dedicated or shared processor and, typically, firmware or software modules that are executed by the processor. Depending upon implementation-specific or other considerations, the module, manager, handler, detector, interface, identifier, or engine can be centralized or its functionality distributed. The module, manager, handler, detector, interface, identifier, or engine can include general or special purpose hardware, firmware, or software embodied in a machine-readable or computer-readable (storage) medium for execution by the processor.

As used herein, a computer-readable medium or computer-readable storage medium is intended to include all mediums that are statutory (e.g., in the United States, under 35 U.S.C. 101), rather than mediums that are non-statutory in nature to the extent that the exclusion is necessary for a claim that includes the computer-readable (storage) medium to be valid. Some examples of such known statutory machine-readable or computer-readable (storage) mediums include hardware (e.g., registers, random access memory (RAM), non-volatile (NV) storage, to name a few), and can more generally include software, hardware, or a combination of hardware and software.

In one embodiment, a portion of the distributed proxy and cache system for network traffic management resides in or is in communication with device 250, including local proxy 275 (mobile client) and/or cache 285. The local proxy 275 can provide an interface on the device 150 for users to access device applications and services including email, IM, voice mail, visual voicemail, feeds, Internet, other applications, etc.

The proxy 275 is generally application independent and can be used by applications (e.g., both proxy aware and proxy-unaware mobile applications 210 and 220) to open TCP connections to a remote server (e.g., the server 100 in the examples of FIG. 1A-1B and/or server proxy 125/325 shown in the examples of FIG. 1B and FIG. 3). In some instances, the local proxy 275 includes a proxy API 225 which can be optionally used to interface with proxy-aware applications 220 (or mobile applications on a mobile device).

The applications 210 and 220 can generally include any user application, widgets, software, HTTP-based application, web browsers, video or other multimedia streaming or downloading application, video games, social network applications, email clients, RSS management applications, application stores, document management applications, productivity enhancement applications, etc. The applications can be provided with the device OS, by the device manufacturer, by the network service provider, downloaded by the user, or provided by others.

One embodiment of the local proxy 275 includes or is coupled to a context API 206, as shown. The context API 206 may be a part of the operating system 204 or device platform or independent of the operating system 204, as illustrated. The operating system 204 can include any operating system including but not limited to, any previous, current, and/or future versions/releases of, Windows Mobile, iOS, Android, Symbian, Palm OS, Brew MP, Java 2 Micro Edition (J2ME), Blackberry, etc.

The context API 206 may be a plug-in to the operating system 204 or a particular client application on the device 250. The context API 206 can detect signals indicative of user or device activity, for example, sensing motion, gesture, device location, changes in device location, device backlight, keystrokes, clicks, activated touch screen, mouse click or detection of other pointer devices. The context API 206 can be coupled to input devices or sensors on the device 250 to identify these signals. Such signals can generally include input received in response to explicit user input at an input device/mechanism at the device 250 and/or collected from ambient signals/contextual cues detected at or in the vicinity of the device 250 (e.g., light, motion, piezoelectric, etc.).

In one embodiment, the user activity module 215 interacts with the context API 206 to identify, determine, infer, detect, compute, predict, and/or anticipate, characteristics of user activity on the device 250. Various inputs collected by the context API 206 can be aggregated by the user activity module 215 to generate a profile for characteristics of user activity. Such a profile can be generated by the module 215 with various temporal characteristics. For instance, user activity profile can be generated in real-time for a given instant to provide a view of what the user is doing or not doing at a given time (e.g., defined by a time window, in the last minute, in the last 30 seconds, etc.), a user activity profile can also be generated for a 'session' defined by an application or web page that describes the characteristics of user behavior with respect to a specific task they are engaged in on the device 250, or for a specific time period (e.g., for the last 2 hours, for the last 5 hours).

Additionally, characteristic profiles can be generated by the user activity module 215 to depict a historical trend for user activity and behavior (e.g. 1 week, 1 mo, 2 mo, etc.). Such historical profiles can also be used to deduce trends of user behavior, for example, access frequency at different times of day, trends for certain days of the week (weekends or week days), user activity trends based on location data (e.g., IP address, GPS, or cell tower coordinate data) or changes in location data (e.g., user activity based on user location, or user activity based on whether the user is on the go, or traveling outside a home region, etc.) to obtain user activity characteristics.

In one embodiment, user activity module 215 can detect and track user activity with respect to applications, documents, files, windows, icons, and folders on the device 250. For example, the user activity module 215 can detect when an application or window (e.g., a web browser) has been exited, closed, minimized, maximized, opened, moved into the foreground, or into the background, multimedia content playback, etc.

In one embodiment, characteristics of the user activity on the device 250 can be used to locally adjust behavior of the device (e.g., mobile device) to optimize its resource consumption such as battery/power consumption and more generally, consumption of other device resources including memory, storage, and processing power. In one embodiment, the use of a radio on a device can be adjusted based on characteristics of user behavior (e.g., by the radio controller 266 of the connection manager 265) coupled to the user activity module 215. For example, the radio controller 266 can turn the radio on or off, based on characteristics of the user activity on the device 250. In addition, the radio controller 266 can adjust the power mode of the radio (e.g., to be in a higher power mode or lower power mode) depending on characteristics of user activity.

In one embodiment, characteristics of the user activity on device 250 can also be used to cause another device (e.g., other computers, a mobile device, or a non-portable device) or server (e.g., host server 100 and 300 in the examples of FIG. 1A-B and FIG. 3) which can communicate (e.g., via a cellular or other network) with the device 250 to modify its communication frequency with the device 250. The local proxy 275 can use the characteristics information of user behavior determined by the user activity module 215 to instruct the remote device as to how to modulate its communication frequency (e.g., decreasing communication frequency, such as data push frequency if the user is idle, requesting that the remote device notify the device 250 if new data, changed, data, or data of a certain level of importance becomes available, etc.).

In one embodiment, the user activity module 215 can, in response to determining that user activity characteristics indicate that a user is active after a period of inactivity, request that a remote device (e.g., server host server 100 and 300 in the examples of FIG. 1A-B and FIG. 3) send the data that was buffered as a result of the previously decreased communication frequency.

In addition, or in alternative, the local proxy 275 can communicate the characteristics of user activity at the device 250 to the remote device (e.g., host server 100 and 300 in the examples of FIG. 1A-B and FIG. 3) and the remote device determines how to alter its own communication frequency with the device 250 for network resource conservation and conservation of device 250 resources.

One embodiment of the local proxy 275 further includes a request/transaction manager 235, which can detect, identify, intercept, process, manage, data requests initiated on the device 250, for example, by applications 210 and/or 220, and/or directly/indirectly by a user request. The request/transaction manager 235 can determine how and when to process a given request or transaction, or a set of requests/transactions, based on transaction characteristics.

The request/transaction manager 235 can prioritize requests or transactions made by applications and/or users at the device 250, for example by the prioritization engine 238. Importance or priority of requests/transactions can be determined by the manager 235 by applying a rule set, for example, according to time sensitivity of the transaction, time sensitivity of the content in the transaction, time criticality of the transaction, time criticality of the data transmitted in the transaction, and/or time criticality or importance of an application making the request.

In addition, transaction characteristics can also depend on whether the transaction was a result of user-interaction or other user initiated action on the device (e.g., user interaction with a mobile application). In general, a time critical transaction can include a transaction resulting from a user-initiated data transfer, and can be prioritized as such. Transaction characteristics can also depend on the amount of data that will be transferred or is anticipated to be transferred as a result of the request/requested transaction. For example, the connection manager 265, can adjust the radio mode (e.g., high power or low power mode via the radio controller 266) based on the amount of data that will need to be transferred.

In addition, the radio controller 266/connection manager 265 can adjust the radio power mode (high or low) based on time criticality/sensitivity of the transaction. The radio controller 266 can trigger the use of high power radio mode when a time-critical transaction (e.g., a transaction resulting from a user-initiated data transfer, an application running in the foreground, any other event meeting a certain criteria) is initiated or detected.

In general, the priorities can be set in default, for example, based on device platform, device manufacturer, operating system, etc. Priorities can alternatively or in additionally be set by the particular application; for example, the Facebook mobile application can set its own priorities for various transactions (e.g., a status update can be of higher priority than an add friend request or a poke request, a message send request can be of higher priority than a message delete request, for example), an email client or IM chat client may have its own configurations for priority. The prioritization engine 238 may include set of rules for assigning priority.

The priority engine 238 can also track network provider limitations or specifications on application or transaction priority in determining an overall priority status for a request/transaction. Furthermore, priority can in part or in whole be determined by user preferences, either explicit or implicit. A user, can in general, set priorities at different tiers, such as, specific priorities for sessions, or types, or applications (e.g., a browsing session, a gaming session, versus an IM chat session, the user may set a gaming session to always have higher priority than an IM chat session, which may have higher priority than web-browsing session). A user can set application-specific priorities, (e.g., a user may set Facebook related transactions to have a higher priority than LinkedIn related transactions), for specific transaction types (e.g., for all send message requests across all applications to have higher priority than message delete requests, for all calendar-related events to have a high priority, etc.), and/or for specific folders.

The priority engine 238 can track and resolve conflicts in priorities set by different entities. For example, manual settings specified by the user may take precedence over device OS settings, network provider parameters/limitations (e.g., set in default for a network service area, geographic locale, set for a specific time of day, or set based on service/fee type) may limit any user-specified settings and/or application-set priorities. In some instances, a manual sync request received from a user can override some, most, or all priority settings in that the requested synchronization is performed when requested, regardless of the individually assigned priority or an overall priority ranking for the requested action.

Priority can be specified and tracked internally in any known and/or convenient manner, including but not limited to, a binary representation, a multi-valued representation, a graded representation and all are considered to be within the scope of the disclosed technology.

TABLE I

| Change (initiated on device) | Priority | Change (initiated on server) | Priority |
|---|---|---|---|
| Send email | High | Receive email | High |
| Delete email | Low | Edit email | Often not possible to sync (Low if possible) |
| (Un)read email | Low | | |
| Move message | Low | | |
| Read more | High | | |
| Down load attachment | High | New email in deleted items | Low |
| New Calendar event | High | Delete an email | Low |
| Edit/change Calendar event | High | (Un)Read an email | Low |
| | | Move messages | Low |
| Add a contact | High | Any calendar change | High |
| Edit a contact | High | Any contact change | High |
| Search contacts | High | Wipe/lock device | High |
| Change a setting | High | Settings change | High |
| Manual send/receive | High | Any folder change | High |
| IM status change | Medium | Connector restart | High (if no changes nothing is sent) |
| Auction outbid or change notification | High | | |
| Weather Updates | Low | Social Network Status Updates | Medium |
| | | Sever Weather Alerts | High |
| | | News Updates | Low |

Table I above shows, for illustration purposes, some examples of transactions with examples of assigned priorities in a binary representation scheme. Additional assignments are possible for additional types of events, requests, transactions, and as previously described, priority assignments can be made at more or less granular levels, e.g., at the session level or at the application level, etc.

As shown by way of example in the above table, in general, lower priority requests/transactions can include, updating message status as being read, unread, deleting of messages, deletion of contacts; higher priority requests/transactions, can in some instances include, status updates, new IM chat message, new email, calendar event update/cancellation/deletion, an event in a mobile gaming session, or other entertainment related events, a purchase confirmation through a web purchase or online, request to load additional or download content, contact book related events, a transaction to change a device setting, location-aware or location-based events/transactions, or any other events/request/transactions initiated by a user or where the user is known to be, expected to be, or suspected to be waiting for a response, etc.

Inbox pruning events (e.g., email, or any other types of messages), are generally considered low priority and absent other impending events, generally will not trigger use of the radio on the device 250. Specifically, pruning events to remove old email or other content can be 'piggy backed' with other communications if the radio is not otherwise on, at the time of a scheduled pruning event. For example, if the user has preferences set to 'keep messages for 7 days old,' then instead of powering on the device radio to initiate a message delete from the device 250 the moment that the message has exceeded 7 days old, the message is deleted when the radio is powered on next. If the radio is already on, then pruning may occur as regularly scheduled.

The request/transaction manager 235, can use the priorities for requests (e.g., by the prioritization engine 238) to manage outgoing traffic from the device 250 for resource optimization (e.g., to utilize the device radio more efficiently for battery conservation). For example, transactions/requests below a certain priority ranking may not trigger use of the radio on the device 250 if the radio is not already switched on, as controlled by the connection manager 265. In contrast, the radio controller 266 can turn on the radio such a request can be sent when a request for a transaction is detected to be over a certain priority level.

In one embodiment, priority assignments (such as that determined by the local proxy 275 or another device/entity) can be used cause a remote device to modify its communication with the frequency with the mobile device. For example, the remote device can be configured to send notifications to the device 250 when data of higher importance is available to be sent to the mobile device.

In one embodiment, transaction priority can be used in conjunction with characteristics of user activity in shaping or managing traffic, for example, by the traffic shaping engine 255. For example, the traffic shaping engine 255 can, in response to detecting that a user is dormant or inactive, wait to send low priority transactions from the device 250, for a period of time. In addition, the traffic shaping engine 255 can allow multiple low priority transactions to accumulate for batch transferring from the device 250 (e.g., via the batching module 257). In one embodiment, the priorities can be set, configured, or readjusted by a user. For example, content depicted in Table I in the same or similar form can be accessible in a user interface on the device 250 and for example, used by the user to adjust or view the priorities.

The batching module 257 can initiate batch transfer based on certain criteria. For example, batch transfer (e.g., of multiple occurrences of events, some of which occurred at different instances in time) may occur after a certain number of low priority events have been detected, or after an amount of time elapsed after the first of the low priority event was initiated. In addition, the batching module 257 can initiate batch transfer of the cumulated low priority events when a higher priority event is initiated or detected at the device 250. Batch transfer can otherwise be initiated when radio use is triggered for another reason (e.g., to receive data from a remote device such as host server 100 or 300). In one embodiment, an impending pruning event (pruning of an inbox), or any other low priority events, can be executed when a batch transfer occurs.

In general, the batching capability can be disabled or enabled at the event/transaction level, application level, or session level, based on any one or combination of the following: user configuration, device limitations/settings, manufacturer specification, network provider parameters/limitations, platform specific limitations/settings, device OS settings, etc. In one embodiment, batch transfer can be initiated when an application/window/file is closed out, exited, or moved into the background; users can optionally be prompted before initiating a batch transfer; users can also manually trigger batch transfers.

In one embodiment, the local proxy 275 locally adjusts radio use on the device 250 by caching data in the cache 285. When requests or transactions from the device 250 can be satisfied by content stored in the cache 285, the radio controller 266 need not activate the radio to send the request to a remote entity (e.g., the host server 100, 300, as shown in FIG. 1 and FIG. 3 or a content provider/application server such as the server/provider 110 shown in the examples of FIG. 1A and FIG. 1B). As such, the local proxy 275 can use the local cache 285 and the cache policy manager 245 to locally store data for satisfying data requests to eliminate or reduce the use of the device radio for conservation of network resources and device battery consumption.

In leveraging the local cache, once the request/transaction manager 225 intercepts a data request by an application on the device 250, the local repository 285 can be queried to determine if there is any locally stored response, and also determine whether the response is valid. When a valid response is available in the local cache 285, the response can be provided to the application on the device 250 without the device 250 needing to access the cellular network.

If a valid response is not available, the local proxy 275 can query a remote proxy (e.g., the server proxy 325 of FIG. 3) to determine whether a remotely stored response is valid. If so, the remotely stored response (e.g., which may be stored on the server cache 135 or optional caching server 199 shown in the example of FIG. 1B) can be provided to the mobile device, possibly without the mobile device 250 needing to access the cellular network, thus relieving consumption of network resources.

If a valid cache response is not available, or if cache responses are unavailable for the intercepted data request, the local proxy 275, for example, the caching policy manager 245, can send the data request to a remote proxy (e.g., server proxy 325 of FIG. 3) which forwards the data request to a content source (e.g., application server/content provider 110 of FIG. 1) and a response from the content source can be provided through the remote proxy, as will be further described in the description associated with the example host server 300 of FIG. 3. The cache policy manager 245 can manage or process requests that use a variety of protocols, including but not limited to HTTP, HTTPS, IMAP, POP, SMTP and/or ActiveSync. The caching policy manager 245 can locally store responses for data requests in the local database 285 as cache entries, for subsequent use in satisfying same or similar data requests. The manager 245 can request that the remote proxy monitor responses for the data request, and the remote proxy can notify the device 250 when an unexpected response to the data request is detected. In such an event, the cache policy manager 245 can erase or replace the locally stored response(s) on the device 250 when notified of the unexpected response (e.g., new data, changed data, additional data, etc.) to the data request. In one embodiment, the caching policy manager 245 is able to detect or identify the protocol used for a specific request, including but not limited to HTTP, HTTPS, IMAP, POP, SMTP and/or ActiveSync. In one embodiment, application specific handlers (e.g., via the application protocol module 246 of the manager 245) on the local proxy 275 allows for optimization of any protocol that can be port mapped to a handler in the distributed proxy (e.g., port mapped on the proxy server 325 in the example of FIG. 3).

In one embodiment, the local proxy 275 notifies the remote proxy such that the remote proxy can monitor responses received for the data request from the content source for changed results prior to returning the result to the device 250, for example, when the data request to the content source has yielded same results to be returned to the mobile device. In general, the local proxy 275 can simulate application server responses for applications on the device 250, using locally cached content. This can prevent utilization of the cellular network for transactions where new/changed data is not available, thus freeing up network resources and preventing network congestion.

In one embodiment, the local proxy 275 includes an application behavior detector 236 to track, detect, observe, monitor, applications (e.g., proxy aware and/or unaware applications 210 and 220) accessed or installed on the device 250. Application behaviors, or patterns in detected behaviors (e.g., via the pattern detector 237) of one or more applications accessed on the device 250 can be used by the local proxy 275 to optimize traffic in a wireless network needed to satisfy the data needs of these applications.

For example, based on detected behavior of multiple applications, the traffic shaping engine 255 can align content requests made by at least some of the applications over the network (wireless network) (e.g., via the alignment module 256). The alignment module can delay or expedite some earlier received requests to achieve alignment. When requests are aligned, the traffic shaping engine 255 can utilize the connection manager to poll over the network to satisfy application data requests. Content requests for multiple applications can be aligned based on behavior patterns or rules/settings including, for example, content types requested by the multiple applications (audio, video, text, etc.), mobile device parameters, and/or network parameters/traffic conditions, network service provider constraints/specifications, etc.

In one embodiment, the pattern detector 237 can detect recurrences in application requests made by the multiple applications, for example, by tracking patterns in application behavior. A tracked pattern can include, detecting that certain applications, as a background process, poll an application server regularly, at certain times of day, on certain days of the week, periodically in a predictable fashion, with a certain frequency, with a certain frequency in response to a certain type of event, in response to a certain type user query, frequency that requested content is the same, frequency with which a same request is made, interval between requests, applications making a request, or any combination of the above, for example.

Such recurrences can be used by traffic shaping engine 255 to offload polling of content from a content source (e.g., from an application server/content provider 110 of FIG. 1) that would result from the application requests that would be performed at the mobile device 250 to be performed instead, by a proxy server (e.g., proxy server 125 of FIG. 1B or proxy server 325 of FIG. 3) remote from the device 250. Traffic engine 255 can decide to offload the polling when the recurrences match a rule. For example, there are multiple occurrences or requests for the same resource that have exactly the same content, or returned value, or based on detection of repeatable time periods between requests and responses such as a resource that is requested at specific times during the day. The offloading of the polling can decrease the amount of bandwidth consumption needed by the mobile device 250 to establish a wireless (cellular) connection with the content source for repetitive content polls.

As a result of the offloading of the polling, locally cached content stored in the local cache 285 can be provided to satisfy data requests at the device 250, when content change is not detected in the polling of the content sources. As such, when data has not changed, application data needs can be satisfied without needing to enable radio use or occupying cellular bandwidth in a wireless network. When data has changed and/or new data has been received, the remote entity to which polling is offloaded, can notify the device 250. The remote entity may be the host server 300 as shown in the example of FIG. 3.

In one embodiment, the local proxy 275 can mitigate the need/use of periodic keep-alive messages (heartbeat messages) to maintain TCP/IP connections, which can consume significant amounts of power thus having detrimental impacts on mobile device battery life. The connection manager 265 in the local proxy (e.g., the heartbeat manager 267) can detect, identify, and intercept any or all heartbeat (keep-alive) messages being sent from applications.

The heartbeat manager 267 can prevent any or all of these heartbeat messages from being sent over the cellular, or other network, and instead rely on the server component of the distributed proxy system (e.g., shown in FIG. 1B) to generate the and send the heartbeat messages to maintain a connection with the backend (e.g., app server/provider 110 in the example of FIG. 1).

The local proxy 275 generally represents any one or a portion of the functions described for the individual managers, modules, and/or engines. The local proxy 275 and device 250 can include additional or less components; more or less functions can be included, in whole or in part, without deviating from the novel art of the disclosure.

Figure 2B:
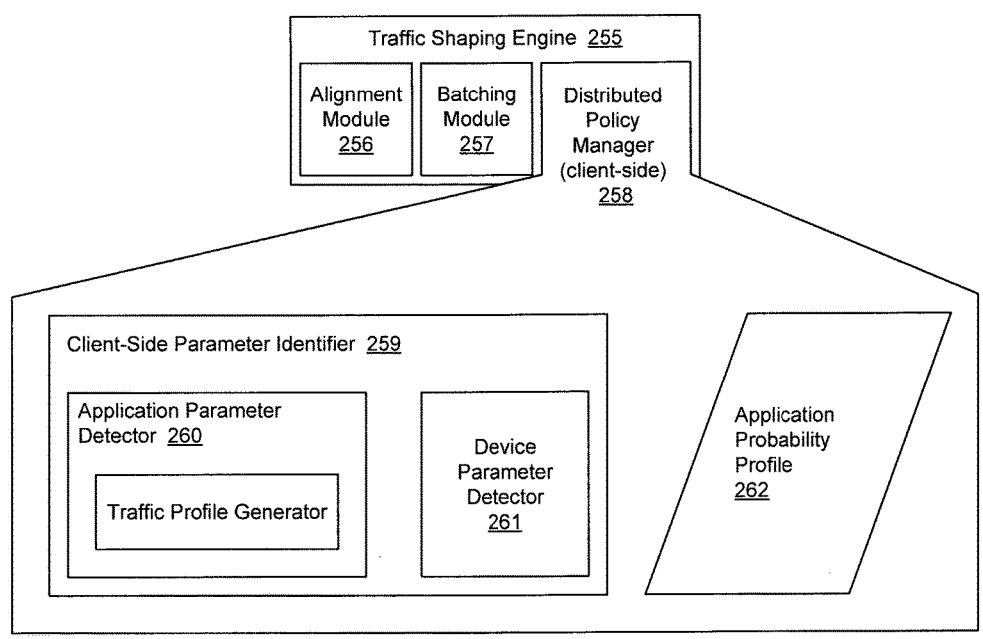
FIG. 2B depicts a block diagram illustrating another example of the traffic shaping engine having a distributed policy manager in the local proxy on the client-side of the distributed proxy system shown in the example of FIG. 2A.

FIG. 2B depicts a block diagram illustrating another example of the traffic shaping engine 255 having a distributed policy manager 258 in the local proxy on the client-side of the distributed proxy system shown in the example of FIG. 2A.

As described in FIG. 2A, the traffic shaping engine 255 is able to manipulate, arrange, batch, combine, forward, delay, prioritize, or de-prioritize traffic at the mobile device 250 (e.g., including traffic originating from applications and/or services at the mobile device 250). In one embodiment, the traffic shaping engine 255 additionally includes a client-side distributed policy manager 258 which can aggregate client-side parameters in formulating and/or implementing a policy for traffic control in the mobile network servicing the mobile device 250. In one embodiment, the client-side parameters include application parameters and device parameters. Thus, the policy manager 258 can obtain and analyze parameters for all applications running or active on the device, as well as parameters for all hardware components and elements of the device.

For example, the client-side application parameters can include an indication or identification of applications installed on the device 250. Application parameters can also include polling frequency of the application, state of the application including background operation, foreground operation, inactive, or active. Furthermore, application traffic parameters such as, by way of example but not limitation, polling rate, protocol used, amount of data, and interaction with other applications can be determined. In general, application parameters can be detected, identified, tracked, monitored, adjusted, updated, modified, or revised by the application parameter detector 260. By using various application parameters, the traffic profile generator can generate a traffic profile for a given application.

In general, application parameters can be identified, monitored, updated, and tracked for multiple applications on the mobile device 250 on a per-application basis. In addition, application parameters can be user configurable or user editable. For example, the user can view all system detected and configured parameters and adjust each parameter as desired.

Device parameters can include generally user-related information, device-related information, and/or network-related information. Some device parameters can include by way of example, but not limitation, user activity status indicating whether the user is active or inactive (e.g., back light, motion sensor, etc.), whether the device is active or inactive, network availability, network strength, network congestion, radio state of each wireless radio on the mobile device, including one or more of, Bluetooth, WiFi, and cellular radios, the on/off or active/inactive state of various hardware components on the device, or the state/reading of any sensor (e.g., touch, gesture, proximity, light, motion, capacitance, resistance, piezoelectric, temperature, etc.) on the device.

Device parameters can be determined, tracked, identified, detected, updated, revised, monitored by, for example, the device parameter detector 261 in the client-side policy manager 258. In addition, some or all of the device parameters may be supplied by the remote host (e.g., host 100 of FIG. 1A/1B, the proxy server 325 of host server 300 in the example of FIG. 3A). For example, network-related parameters such as, network availability, network strength, network congestion, or any other network related operational difficulties may be detected by the remote host or other remote third party and communicated to the device parameter detector 261.

In general, client-side parameters for each application can be system-identified (e.g., by the identifier 259 in the local proxy), all user-identified (e.g., specified via an on-screen widget provided by the local proxy), or a combination of system identified and user identified parameters. The user can specify whether an application is to be configured with parameters detected by the proxy, or whether an application is to be configured with parameters specified by the user, or a combination of both. The user can specify (e.g., through a user interface on the mobile device 250 itself or through another device interface), each individual parameter for an application or modify individual parameters after the system has detected and provided a value. Overall, while some application and device parameters are disclosed herein, the system may of course obtain and analyze other parameters.

In some instances, parameter profiles can be generated to be applied automatically to certain groupings of applications (e.g., groupings based on system-determined or user-determine priority, time sensitivity, importance, device preference, operator settings or preference, user-liking, etc.), initially when an application is first installed, or by default until the user requests that application-specific parameters be determined and applied (e.g., by the identifier 259 and/or by the user). Parameter profiles can be used to initiate some level of high-level traffic optimization before the system has had time to perform application or event specific optimization such that overhead time can be reduced for the user, device, and network operator to begin to experience benefits of traffic and resource consumption optimization.

In one embodiment, such parameter profiles with default settings can be provided by another entity (an entity external to the local proxy 275) and can include, the host server (e.g., the proxy server 325 of server 300 shown in the example of FIG. 3). The parameter profiles with predetermined settings may be automatically pushed from the proxy 325 or provided upon request (e.g., either by the local proxy 275 and/or by the mobile device user). Since the host server 300 or the proxy server 325 on the host server services, monitors, tracks, or otherwise corresponds/communicates In some instances, the mobile device 250 may be accessed by multiple users (e.g. sharing the same user account or using separate accounts on the same device). For example, several family members may share one device, or several corporate users may share a corporate phone, such as a loaner device. Therefore, application parameters may be tracked on a per-user basis for each application on the mobile device, in cases where separate user accounts are used and also in cases where a single account is shared by multiple users. For example, the parameter identifier 259 can provide user interfaces prompting each user to specify application or device parameters or to specify preferences for system configuration or user configuration. Each user can also utilize user interfaces, widgets, or an application on the device 250, or another device to specify their own settings for application and/or device parameters.

Any or all of the client-side parameters as described above can be used to formulate application probability profiles 262 for some or all applications on device 250. An application probability profile can specify, for instance, using poll frequency of an application, an indication of how frequently polls of the application results in new data to be received which allows a prediction of the likelihood or probability that a subsequent poll will find new or changed data.

Specifically, the local proxy 275 can use the client-side parameters to determine the frequency with which polling by an application yields new data and can create a probability profile for the application using the determined frequency. Such probability profiles 262 can then be used by the traffic shaping engine 255 to determine how to handle and satisfy particular data request initiated at the mobile device. For example, the probability profile can be used (e.g., by the caching policy manager 245 shown in the example of FIG. 2A) to determine whether to respond to an application poll using a local cache on the mobile device.

If the probability for a request generated by an application indicates a lower than threshold probability of finding new data at the app server/content host (e.g., server/provider 110 of FIG. 1A/1B) the local proxy 275 may decide to satisfy the request with a previously cached response to this request instead of allowing the data request to go over the cellular network and/or to turn on an otherwise off radio. Application probability profiles can be used by the local proxy 275 to formulate a policy for traffic control at the mobile device, between the mobile device 275, the host server (e.g. server 100/300, and app server/provider 110).

The traffic policy can be formulated based on the probability profiles and can factor in additional criteria such as device state, user state, and/or network state. For example, a traffic policy can indicate that for an application or data request with a given probability of finding new data, the request is to be forwarded over the air given certain network conditions (e.g., as identified by network parameters: not congested or otherwise without identified operational difficulties). The decision in a traffic policy as to whether a request with a certain level of probability is to be forwarded over the cellular network can also be based on whether the user is active and/or whether the application is in the foreground (as identified by the application and/or device parameters), for example.

For example, the traffic shaping engine 255 can decide as part of a traffic policy to delay a poll for an application even if the server has signaled new data availability, if another application is about to poll and/or if the probability to find new data for this second application is higher than a threshold. This decision can include an additional criteria defined in the traffic policy such that network conditions (e.g., operational difficulties) are considered.

Note that the traffic policy can be formulated by the traffic shaping engine 255 using alignment and/or batching processes, as described in FIG. 2A. The traffic policy can also be jointly formulated with the remote server (e.g., server 100 or 300), and be adjustable dynamically, on-demand, automatically, based on certain triggers, or based on user request, or other types of user explicit and implicit triggers. In general, implementation of the policy can be performed solely by the local proxy 275 or jointly with the remote server (e.g., proxy server 175, or 375 on the hosts 100 or 300 respectively).

Note that when the traffic policy is formulated in conjunction with a remote server, or in some instances, solely by the remote server (e.g., server 100 or 300), additional parameters can be aggregated and used in defining such policies. For example, server-side parameters which can be detected and aggregated can be used in formulating traffic policies or further refining already-defined traffic policies, as will be further discussed in description associated with the example of FIG. 3B.

Figure 3A:
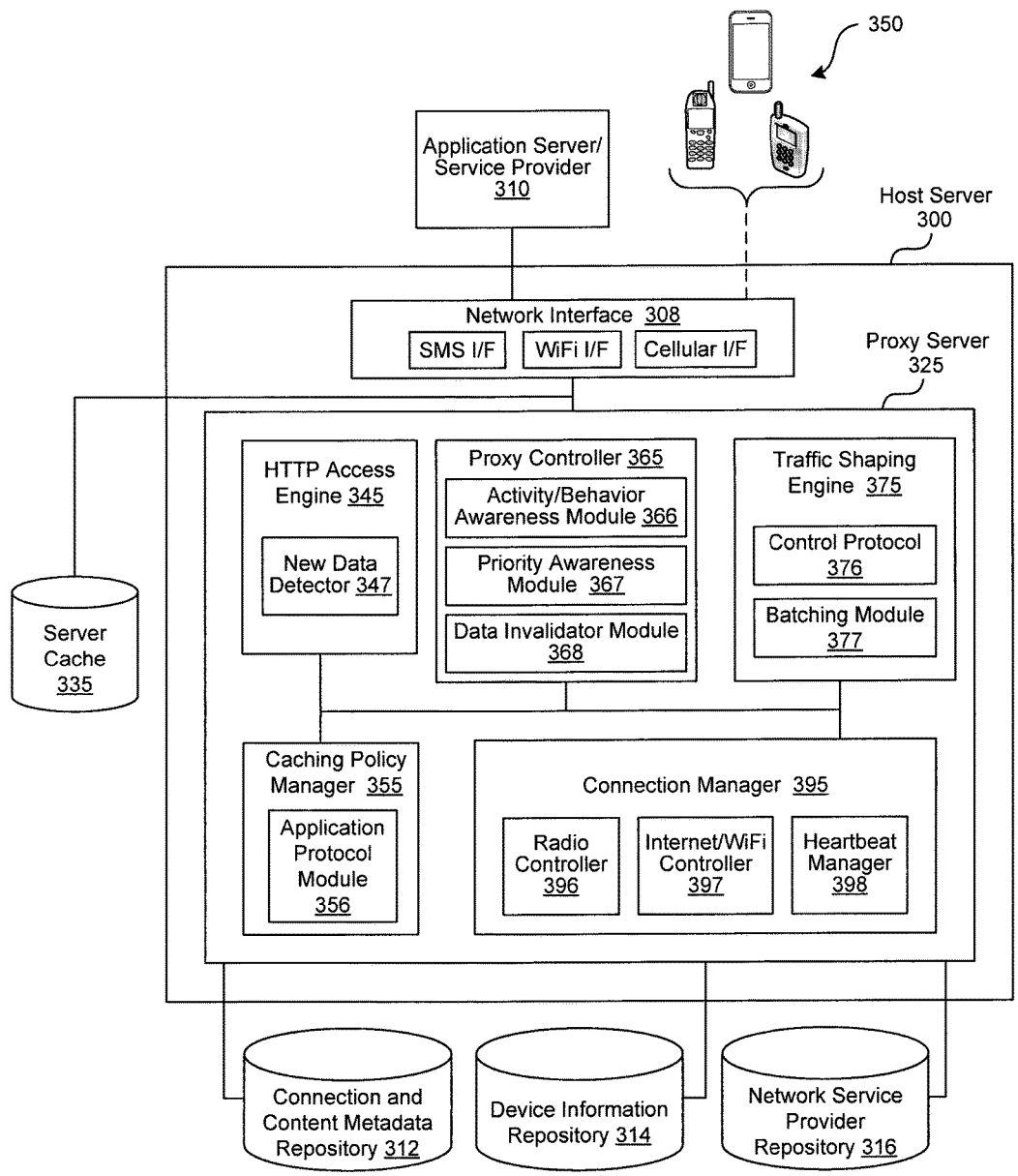
FIG. 3A depicts a block diagram illustrating an example of server-side components in a distributed proxy and cache system that manages traffic in a wireless network for resource conservation.

FIG. 3A depicts a block diagram illustrating an example of server-side components in a distributed proxy and cache system residing on a host server 300 that manages traffic in a wireless network for resource conservation.

The host server 300 generally includes, for example, a network interface 308 and/or one or more repositories 312, 314, 316. Note that server 300 may be any portable/mobile or non-portable device, server, cluster of computers and/or other types of processing units (e.g., any number of a machine shown in the example of FIG. 11) able to receive, transmit signals to satisfy data requests over a network including any wired or wireless networks (e.g., WiFi, cellular, Bluetooth, etc.).

The network interface 308 can include networking module(s) or devices(s) that enable the server 300 to mediate data in a network with an entity that is external to the host server 300, through any known and/or convenient communications protocol supported by the host and the external entity. Specifically, the network interface 308 allows the server 308 to communicate with multiple devices including mobile phone devices 350, and/or one or more application servers/content providers 310.

The host server 300 can store information about connections (e.g., network characteristics, conditions, types of connections, etc.) with devices in the connection metadata repository 312. Additionally, any information about third party application or content providers can also be stored in 312. The host server 300 can store information about devices (e.g., hardware capability, properties, device settings, device language, network capability, manufacturer, device model, OS, OS version, etc.) in the device information repository 314. Additionally, the host server 300 can store information about network providers and the various network service areas in the network service provider repository 316.

The communication enabled by 308 allows for simultaneous connections (e.g., including cellular connections) with devices 350 and/or connections (e.g., including wired/wireless, HTTP, Internet connections, LAN, Wifi, etc.) with content servers/providers 310, to manage the traffic between devices 350 and content providers 310, for optimizing network resource utilization and/or to conserver power (battery) consumption on the serviced devices 350. The host server 300 can communicate with mobile devices 350 serviced by different network service providers and/or in the same/different network service areas. The host server 300 can operate and is compatible with devices 350 with varying types or levels of mobile capabilities, including by way of example but not limitation, 1G, 2G, 2G transitional (2.5G, 2.75G), 3G (IMT-2000), 3G transitional (3.5G, 3.75G, 3.9G), 4G (IMT-advanced), etc.

In general, the network interface 308 can include one or more of a network adaptor card, a wireless network interface card (e.g., SMS interface, WiFi interface, interfaces for various generations of mobile communication standards including but not limited to 2G, 3G, 3.5G, 4G type networks such as, LTE, WiMAX, etc.,), Bluetooth, WiFi, or any other network whether or not connected via a router, an access point, a wireless router, a switch, a multilayer switch, a protocol converter, a gateway, a bridge, bridge router, a hub, a digital media receiver, and/or a repeater.

The host server 300 can further include, server-side components of the distributed proxy and cache system which can include, a proxy server 325 and a server cache 335. In one embodiment, the server proxy 325 can include an HTTP access engine 345, a caching policy manager 355, a proxy controller 365, a traffic shaping engine 375, a new data detector 386, and/or a connection manager 395.

The HTTP access engine 345 may further include a heartbeat manager 346, the proxy controller 365 may further include a data invalidator module 366, the traffic shaping engine 375 may further include a control protocol 276 and a batching module 377. Additional or less components/modules/engines can be included in the proxy server 325 and each illustrated component.

As used herein, a "module," "a manager," a "handler," a "detector," an "interface," a "controller," or an "engine" includes a general purpose, dedicated or shared processor and, typically, firmware or software modules that are executed by the processor. Depending upon implementation-specific or other considerations, the module, manager, handler, or engine can be centralized or its functionality distributed. The module, manager, handler, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In the example of a device (e.g., mobile device 350) making an application or content request to an app server or content provider 310, the request may be intercepted and routed to the proxy server 325, which is coupled to the device 350 and the provider 310. Specifically, the proxy server is able to communicate with the local proxy (e.g., proxy 175 and 275 of the examples of FIG. 1 and FIG. 2 respectively) of the device 350, the local proxy forwards the data request to the proxy server 325 for, in some instances, further processing, and if needed, for transmission to the content server 310 for a response to the data request.

In such a configuration, the host 300, or the proxy server 325 in the host server 300 can utilize intelligent information provided by the local proxy in adjusting its communication with the device in such a manner that optimizes use of network and device resources. For example, the proxy server 325 can identify characteristics of user activity on the device 350 to modify its communication frequency. The characteristics of user activity can be determined by, for example, the activity/behavior awareness module 366 in the proxy controller 365, via information collected by the local proxy on the device 350.

In one embodiment, communication frequency can be controlled by the connection manager 396 of the proxy server 325, for example, to adjust push frequency of content or updates to the device 350. For instance, push frequency can be decreased by the connection manager 396 when characteristics of the user activity indicate that the user is inactive. In one embodiment, when the characteristics of the user activity indicate that the user is subsequently active after a period of inactivity, the connection manager 396 can adjust the communication frequency with the device 350 to send data that was buffered as a result of decreased communication frequency, to the device 350.

In addition, the proxy server 325 includes priority awareness of various requests, transactions, sessions, applications, and/or specific events. Such awareness can be determined by the local proxy on the device 350 and provided to the proxy server 325. The priority awareness module 367 of the proxy server 325 can generally assess the priority (e.g., including time-criticality, time-sensitivity, etc.) of various events or applications; additionally, the priority awareness module 367 can track priorities determined by local proxies of devices 350.

In one embodiment, through priority awareness, the connection manager 395 can further modify communication frequency (e.g., use or radio as controlled by the radio controller 396) of the server 300 with the devices 350. For example, the server 300 can notify the device 350, thus requesting use of the radio if it is not already in use, when data or updates of an importance/priority level which meets a criteria becomes available to be sent.

In one embodiment, the proxy server 325 can detect multiple occurrences of events (e.g., transactions, content, data received from server/provider 310) and allow the events to accumulate for batch transfer to device 350. Batch transfer can be cumulated and transfer of events can be delayed based on priority awareness and/or user activity/application behavior awareness, as tracked by modules 366 and/or 367. For example, batch transfer of multiple events (of a lower priority) to the device 350 can be initiated by the batching module 377 when an event of a higher priority (meeting a threshold or criteria) is detected at the server 300. In addition, batch transfer from the server 300 can be triggered when the server receives data from the device 350, indicating that the device radio is already in use and is thus on. In one embodiment, the proxy server 324 can order the each messages/packets in a batch for transmission based on event/transaction priority, such that higher priority content can be sent first, in case connection is lost or the battery dies, etc.

In one embodiment, the server 300 caches data (e.g., as managed by the caching policy manager 355) such that communication frequency over a network (e.g., cellular network) with the device 350 can be modified (e.g., decreased). The data can be cached, for example in the server cache 335, for subsequent retrieval or batch sending to the device 350 to potentially decrease the need to turn on the device 350 radio. The server cache 335 can be partially or wholly internal to the host server 300, although in the example of FIG. 3, it is shown as being external to the host 300. In some instances, the server cache 335 may be the same as and/or integrated in part or in whole with another cache managed by another entity (e.g., the optional caching proxy server 199 shown in the example of FIG. 1B), such as being managed by an application server/content provider 110, a network service provider, or another third party.

In one embodiment, content caching is performed locally on the device 350 with the assistance of host server 300. For example, proxy server 325 in the host server 300 can query the application server/provider 310 with requests and monitor changes in responses. When changed or new responses are detected (e.g., by the new data detector 347), the proxy server 325 can notify the mobile device 350, such that the local proxy on the device 350 can make the decision to invalidate (e.g., indicated as out-dated) the relevant cache entries stored as any responses in its local cache. Alternatively, the data invalidator module 368 can automatically instruct the local proxy of the device 350 to invalidate certain cached data, based on received responses from the application server/provider 310. The cached data is marked as invalid, and can get replaced or deleted when new content is received from the content server 310.

Note that data change can be detected by the detector 347 in one or more ways. For example, the server/provider 310 can notify the host server 300 upon a change. The change can also be detected at the host server 300 in response to a direct poll of the source server/provider 310. In some instances, the proxy server 325 can in addition, pre-load the local cache on the device 350 with the new/updated data. This can be performed when the host server 300 detects that the radio on the mobile device is already in use, or when the server 300 has additional content/data to be sent to the device 350.

One or more the above mechanisms can be implemented simultaneously or adjusted/configured based on application (e.g., different policies for different servers/providers 310). In some instances, the source provider/server 310 may notify the host 300 for certain types of events (e.g., events meeting a priority threshold level). In addition, the provider/server 310 may be configured to notify the host 300 at specific time intervals, regardless of event priority.

In one embodiment, the proxy server 325 of the host 300 can monitor/track responses received for the data request from the content source for changed results prior to returning the result to the mobile device, such monitoring may be suitable when data request to the content source has yielded same results to be returned to the mobile device, thus preventing network/power consumption from being used when no new/changes are made to a particular requested. The local proxy of the device 350 can instruct the proxy server 325 to perform such monitoring or the proxy server 325 can automatically initiate such a process upon receiving a certain number of the same responses (e.g., or a number of the same responses in a period of time) for a particular request.

In one embodiment, the server 300, for example, through the activity/behavior awareness module 366, is able to identify or detect user activity, at a device that is separate from the mobile device 350. For example, the module 366 may detect that a user's message inbox (e.g., email or types of inbox) is being accessed. This can indicate that the user is interacting with his/her application using a device other than the mobile device 350 and may not need frequent updates, if at all.

The server 300, in this instance, can thus decrease the frequency with which new or updated content is sent to the mobile device 350, or eliminate all communication for as long as the user is detected to be using another device for access. Such frequency decrease may be application specific (e.g., for the application with which the user is interacting with on another device), or it may be a general frequency decrease (e.g., since the user is detected to be interacting with one server or one application via another device, he/she could also use it to access other services) to the mobile device 350.

In one embodiment, the host server 300 is able to poll content sources 310 on behalf of devices 350 to conserve power or battery consumption on devices 350. For example, certain applications on the mobile device 350 can poll its respective server 310 in a predictable recurring fashion. Such recurrence or other types of application behaviors can be tracked by the activity/behavior module 366 in the proxy controller 365. The host server 300 can thus poll content sources 310 for applications on the mobile device 350, that would otherwise be performed by the device 350 through a wireless (e.g., including cellular connectivity). The host server can poll the sources 310 for new or changed data by way of the HTTP access engine 345 to establish HTTP connection or by way of radio controller 396 to connect to the source 310 over the cellular network. When new or changed data is detected, the new data detector can notify the device 350 that such data is available and/or provide the new/changed data to the device 350.

In one embodiment, the connection manager 395 determines that the mobile device 350 is unavailable (e.g., the radio is turned off) and utilizes SMS to transmit content to the device 350, for instance via the SMSC shown in the example of FIG. 1B. SMS is used to transmit invalidation messages, batches of invalidation messages, or even content in the case the content is small enough to fit into just a few (usually one or two) SMS messages. This avoids the need to access the radio channel to send overhead information. The host server 300 can use SMS for certain transactions or responses having a priority level above a threshold or otherwise meeting a criteria. The server 300 can also utilize SMS as an out-of-band trigger to maintain or wake-up an IP connection as an alternative to maintaining an always-on IP connection.

In one embodiment, the connection manager 395 in the proxy server 325 (e.g., the heartbeat manager 398) can generate and/or transmit heartbeat messages on behalf of connected devices 350, to maintain a backend connection with a provider 310 for applications running on devices 350.

For example, in the distributed proxy system, local cache on the device 350 can prevent any or all heartbeat messages needed to maintain TCP/IP connections required for applications, from being sent over the cellular, or other network, and instead rely on the proxy server 325 on the host server 300 to generate and/or send the heartbeat messages to maintain a connection with the backend (e.g., app server/provider 110 in the example of FIG. 1). The proxy server can generate the keep-alive (heartbeat) messages independent of the operations of the local proxy on the mobile device.

The repositories 312, 314, and/or 316 can additionally store software, descriptive data, images, system information, drivers, and/or any other data item utilized by other components of the host server 300 and/or any other servers for operation. The repositories may be managed by a database management system (DBMS), for example but not limited to, Oracle, DB2, Microsoft Access, Microsoft SQL Server, PostgreSQL, MySQL, FileMaker, etc.

The repositories can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

Figure 3B:
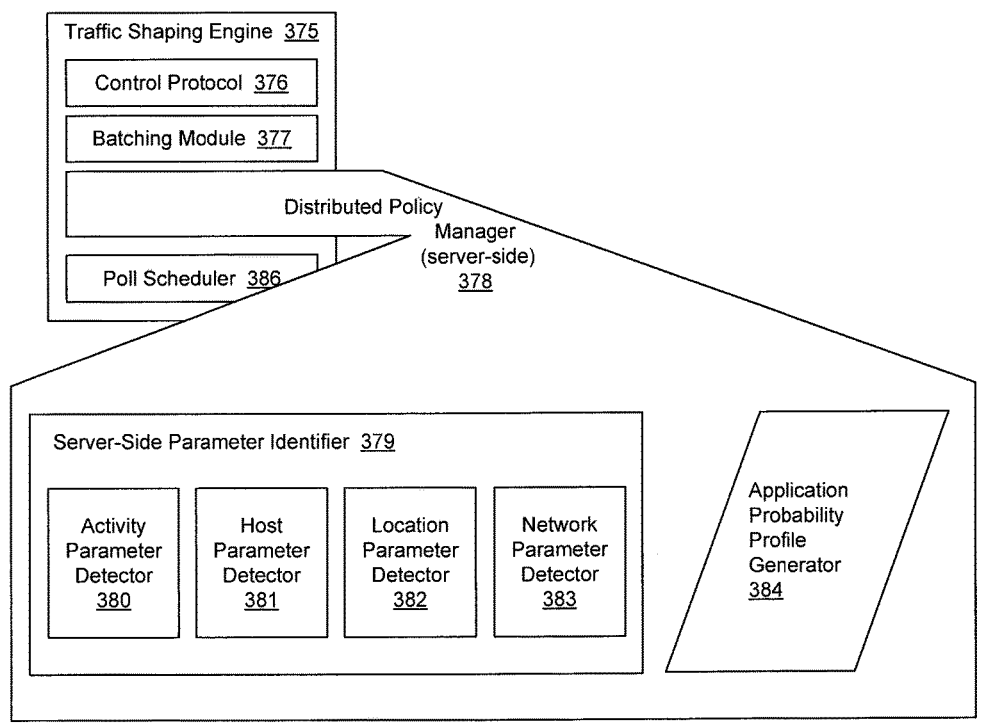
FIG. 3B depicts a block diagram illustrating another example of the traffic shaping engine as further including a distributed policy manager in the proxy server shown in the example of FIG. 3A.

FIG. 3B depicts a block diagram illustrating another example of the traffic shaping engine 375 as further including a distributed policy manager 378 in the proxy server 325 shown in the example of FIG. 3A.

As described in FIG. 3A, the traffic shaping engine 375 is able to manipulate, arrange, batch, combine, forward, delay, prioritize, or de-prioritize traffic at the host server 300 (e.g., including traffic originating from or destined to applications and/or services at the mobile device 250 and/or traffic originating from or destined to an app server/provider 110). In one embodiment, the traffic shaping engine 255 additionally includes a server-side distributed policy manager 378 which can aggregate server-side parameters in formulating and/or implementing a policy for traffic control in the mobile network servicing the mobile device 250. In one embodiment, the server-side parameters include network parameters, activity parameters for multiple devices and/or users, location parameters (as determined from triangulation, GPS, or other means), and can be detected, identified, tracked, monitored, adjusted, updated, modified, or revised by the components (e.g., the activity parameter detector 308, host parameter detector 381, location parameter detector 382, and/or the network parameter detector 383) in the server-side parameter identifier 379, for example.

As discussed for the client-side parameters, the server-side parameters or use of server side parameters may be user configurable, on a device-by-device basis, and/or application-by-application (service-by-service) basis. Use and aggregation of such parameters may be enabled or disabled by the user or other parties, such as the device manufacturer, network operator, application/service provider, etc.

Using various server-side parameters (with or without consideration of the client-side parameter), the application probability profile generator 384 can generate application probability profiles, as discussed in FIG. 2B. The traffic shaping engine 375 can use the application probability profiles to generate, define, update, revise, formulate, or modify traffic policies across one or more of multiple dimensions (e.g., user, application, network operator, device OS, etc.). In addition or in alternate, the local proxies of respective mobile clients create traffic profiles (e.g., including application probability profiles and traffic policies) of applications installed on the mobile clients and transfer the traffic profiles to the proxy server for use in managing network resources in the wireless network, for example, across multiple mobile devices and/or networks and/or network operators.

For example, traffic policies can be formulated by the traffic shaping engine 375 on the server side for a given application on a given device, a given application across multiple devices, a given application for a given user, or a given application for devices on a given wireless network, or a given application given a particular operating system, etc. The application probability profile generator 384 can also generate a traffic profile for a given user or a given device, or a given operating system, or a given network that can be application-independent or application-dependent. Such policies can factor into any of the client-side parameters such as those aggregated by the local proxy 275.

In one embodiment, the server 300 or the proxy server 325 in the host server 300 can detect that multiple mobile clients are requesting content polls directed towards a common host server (e.g., application server 110), for example, within a certain timeframe. The traffic shaping engine 375 can formulate a policy such that the common host server is polled once for all such common requests directed towards the same server and occurring within a specified time frame. The traffic policy may further be formulated such that the received response or data/content is sent to each of the request multiple mobile clients such that each client need not make individual polls to the common host server.

In another example, traffic policies are formulated by the traffic shaping engine 375 based on network conditions. For example, the network parameter detector 385 in the proxy server 325 can track network conditions in a specific network area or multiple network areas, for a single network operator, or multiple network operators. Network congestion can be detected based on, by way of example but not limitation, failure of mobile clients in the specific network area to be able to connect to the wireless network, reported by a network operator or a user.

In one embodiment, the traffic shaping engine 375 sets polling schedules for the mobile clients in a specific network area according to the network conditions, or for mobile clients serviced by a specific network operator, for example. Polling schedules can be adjusted or modified by blocking polls from reaching the wireless network or from the intended destination (e.g., content host or host server). The blocking can be performed by the local proxy and/or the proxy server. In addition, the traffic shaping engine 375 can adjust the polling frequency made to content hosts (e.g., application server/content provider 110) based on a number of mobile clients serviced in the specific network area (e.g. to promote user experience, mitigate the chances of experiencing slowness/delays, prevent traffic congestion or to prevent further congestion), for example, if the network congestion reaches a threshold level.

In one embodiment, the traffic shaping engine 375 can communicating the polling schedules to the mobile clients in the specific network area. The polling schedules can include instructions for the mobile clients to poll on different schedules so as to avoid congestion. The schedules may be application dependent or application independent, or destination server dependent or independent. In another example, the proxy server 375 detects network congestion in a specific area, and can modify some or all traffic policies to reduce polling frequency for content made to hosts made by all or some of the mobile clients serviced in the specific network area where congestion is detected. The applications for which poll frequency is reduced may meet a certain criterion, for example, the application may be a low priority application, or an application running in the background as opposed to the foreground.

The traffic policies modified in this situation may further depend on device, application provider, or network operator specifications. For example, the network operator may allow certain subscribers (e.g., those with premier or higher tier service plans, or otherwise higher paying customers) to access the network with priority when the network is congested.

Figure 4:
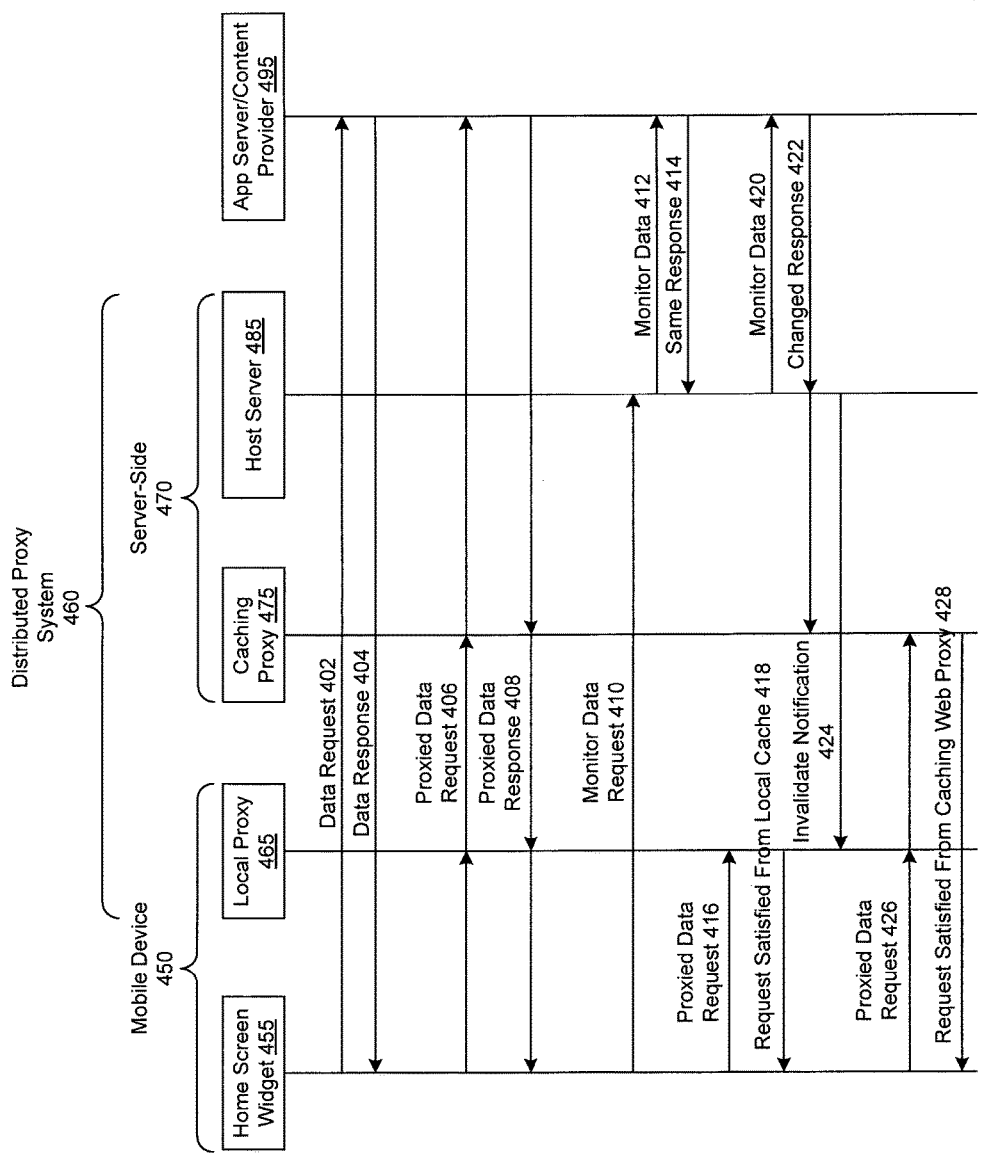
FIG. 4 depicts a diagram showing how data requests from a mobile device to an application server/content provider in a wireless network can be coordinated by a distributed proxy system in a manner such that network and battery resources are conserved through using content caching and monitoring performed by the distributed proxy system.

FIG. 4 depicts a diagram showing how data requests from a mobile device 450 to an application server/content provider 496 in a wireless network can be coordinated by a distributed proxy system 460 in a manner such that network and battery resources are conserved through using content caching and monitoring performed by the distributed proxy system 460.

In satisfying application or client requests on a mobile device 450 without the distributed proxy system 460, the mobile device 450, or the software widget executing on the device 450 performs a data request 402 (e.g., an HTTP GET, POST, or other request) directly to the application server 495 and receives a response 404 directly from the server/provider 495. If the data has been updated, the widget on the mobile device 450 can refreshes itself to reflect the update and waits for small period of time and initiates another data request to the server/provider 495.

In one embodiment, the requesting client or software widget 455 on the device 450 can utilize the distributed proxy system 460 in handling the data request made to server/provider 495. In general, the distributed proxy system 460 can include a local proxy 465 (which is typically considered a client-side component of the system 460 and can reside on the mobile device 450), a caching proxy (475, considered a server-side component 470 of the system 460 and can reside on the host server 485 or be wholly or partially external to the host server 485), a host server 485. The local proxy 465 can be connected to the proxy 475 and host server 485 via any network or combination of networks.

When the distributed proxy system 460 is used for data/application requests, the widget 455 can perform the data request 406 via the local proxy 465. The local proxy 465, can intercept the requests made by device applications, and can identify the connection type of the request (e.g., an HTTP get request or other types of requests). The local proxy 465 can then query the local cache for any previous information about the request (e.g., to determine whether a locally stored response is available and/or still valid). If a locally stored response is not available or if there is an invalid response stored, the local proxy 465 can update or store information about the request, the time it was made, and any additional data, in the local cache. The information can be updated for use in potentially satisfying subsequent requests.

The local proxy 465 can then send the request to the host server 485 and the server 485 can perform the request 406 and returns the results in response 408. The local proxy 465 can store the result and in addition, information about the result and returns the result to the requesting widget 455.

In one embodiment, if the same request has occurred multiple times (within a certain time period) and it has often yielded same results, the local proxy 465 can notify 410 the server 485 that the request should be monitored (e.g., steps 412 and 414) for result changes prior to returning a result to the local proxy 465 or requesting widget 455.

In one embodiment, if a request is marked for monitoring, the local proxy 465 can now store the results into the local cache. Now, when the data request 416, for which a locally response is available, is made by the widget 455 and intercepted at the local proxy 465, the proxy 465 can return the response 418 from the local cache without needing to establish a connection communication over the wireless network.

In addition, the server proxy performs the requests marked for monitoring 420 to determine whether the response 422 for the given request has changed. In general, the host server 485 can perform this monitoring independently of the widget 455 or local proxy 465 operations. Whenever an unexpected response 422 is received for a request, the server 485 can notify the local proxy 465 that the response has changed (e.g., the invalidate notification in step 424) and that the locally stored response on the client should be erased or replaced with a new response.

In this case, a subsequent data request 426 by the widget 455 from the device 450 results in the data being returned from host server 485 (e.g., via the caching proxy 475). Thus, through utilizing the distributed proxy system 460 the wireless (cellular) network is intelligently used when the content/data for the widget or software application 455 on the mobile device 450 has actually changed. As such, the traffic needed to check for the changes to application data is not performed over the wireless (cellular) network. This reduces the amount of generated network traffic and shortens the total time and the number of times the radio module is powered up on the mobile device 450, thus reducing battery consumption, and in addition, frees up network bandwidth.

Figure 5:
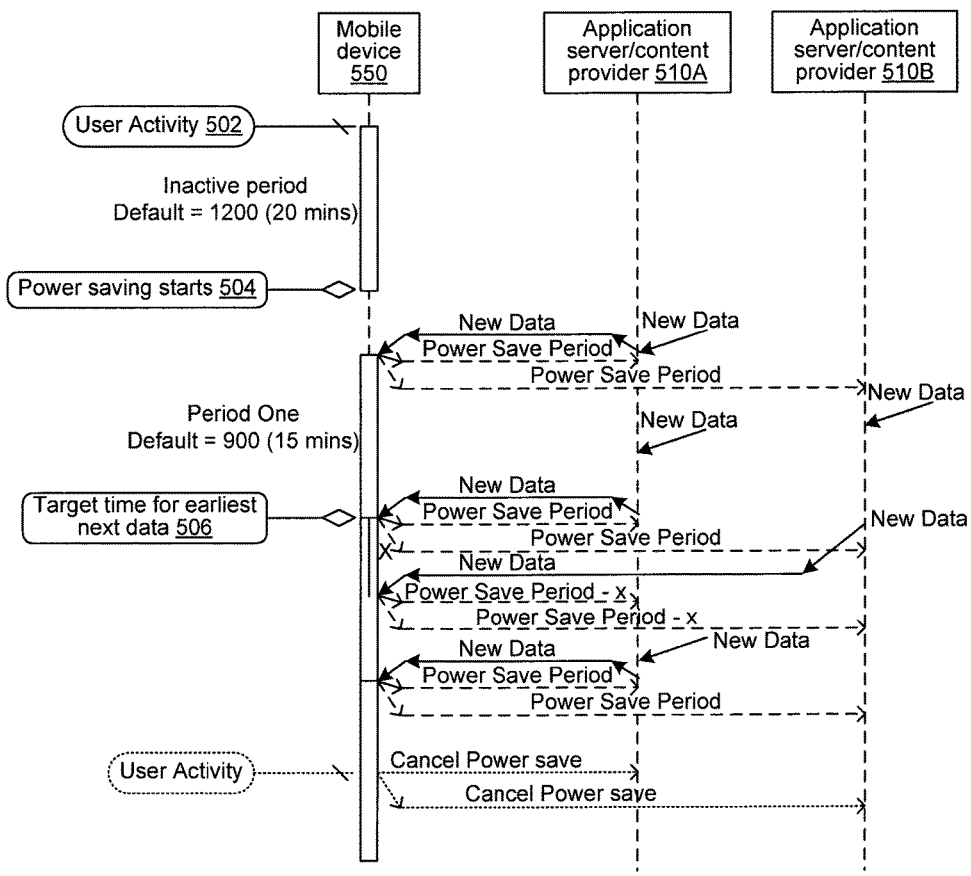
FIG. 5 depicts a diagram showing one example process for implementing a hybrid IP and SMS power saving mode on a mobile device using a distributed proxy and cache system (e.g., such as the distributed system shown in the example of FIG. 1B).

FIG. 5 depicts a diagram showing one example process for implementing a hybrid IP and SMS power saving mode on a mobile device 550 using a distributed proxy and cache system (e.g., such as the distributed system shown in the example of FIG. 1B).

In step 502, the local proxy (e.g., proxy 175 in the example of FIG. 1B) monitors the device for user activity. When the user is determined to be active, server push is active. For example, always-on-push IP connection can be maintained and if available, SMS triggers can be immediately sent to the mobile device 550 as it becomes available.

In process 504, after the user has been detected to be inactive or idle over a period of time (e.g., the example is shown for a period of inactivity of 20 min.), the local proxy can adjust the device to go into the power saving mode. In the power saving mode, when the local proxy receives a message or a correspondence from a remote proxy (e.g., the server proxy 135 in the example of FIG. 1B) on the server-side of the distributed proxy and cache system, the local proxy can respond with a call indicating that the device 550 is currently in power save mode (e.g., via a power save remote procedure call). In some instances, the local proxy can take the opportunity to notify multiple accounts or providers (e.g., 510A, and 510B) of the current power save status (e.g., timed to use the same radio power-on event).

In one embodiment, the response from the local proxy can include a time (e.g., the power save period) indicating to the remote proxy (e.g., server proxy 135) and/or the app server/providers 510A/B when the device 550 is next able to receive changes or additional data. A default power savings period can be set by the local proxy.

In one embodiment, if new, change, or different data or event is received before the end of any one power saving period, then the wait period communicated to the servers 510A/B can be the existing period, rather than an incremented time period. In response, the remote proxy server, upon receipt of power save notification from the device 550, can stop sending changes (data or SMSs) for the period of time requested (the wait period). At the end of the wait period, any notifications received can be acted upon and changes sent to the device 550, for example, as a single batched event or as individual events. If no notifications come in, then push can be resumed with the data or an SMS being sent to the device 550. The proxy server can time the poll or data collect event to optimize batch sending content to the mobile device 550 to increase the chance that the client will receive data at the next radio power on event.

Note that the wait period can be updated in operation in real time to accommodate operating conditions. For example, the local proxy can adjust the wait period on the fly to accommodate the different delays that occur in the system.

Detection of user activity 512 at the device 550 causes the power save mode to be exited. When the device 550 exits power save mode, it can begin to receive any changes associated with any pending notifications. If a power saving period has expired, then no power save cancel call may be needed as the proxy server will already be in traditional push operation mode.

In one embodiment, power save mode is not applied when the device 550 is plugged into a charger. This setting can be reconfigured or adjusted by the user or another party. In general, the power save mode can be turned on and off, for example, by the user via a user interface on device 550. In general, timing of power events to receive data can be synced with any power save calls to optimize radio use.

Figure 6:
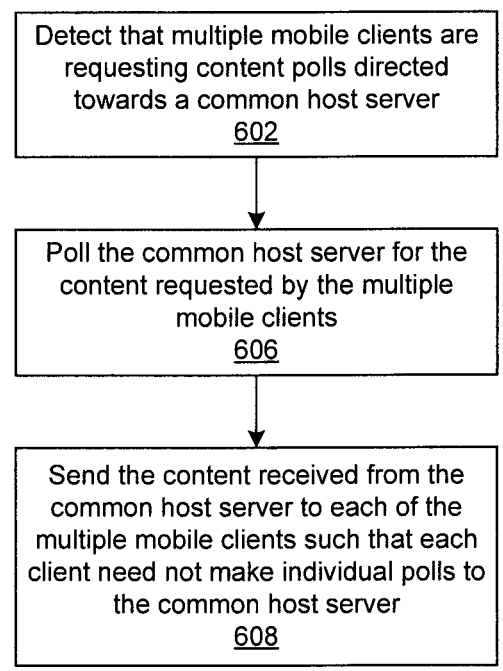
FIG. 6 depicts a flow chart illustrating an example process for using a single server poll to satisfy multiple mobile client requests.

FIG. 6 depicts a flow chart illustrating an example process for using a single server poll to satisfy multiple mobile client requests.

In process 602, it is detected (e.g., by a host server 100 or 300 or proxy server 325 in the host 300) that multiple mobile clients are requesting content polls directed towards a common host server (e.g., an application server/content provider 110). In process 604, the common host server is polled for the content requested by the multiple mobile clients. The common host server can be polled just once, or a few instances but less than the total number of mobile clients that actually requested the content polls to preemptively prevent duplicate traffic from being sent over the wireless network since content polls occurring at or approximately the same time would likely yield the same response having same content.

Thus, in process 608, the content received from the common host server is sent to each of the multiple mobile clients such that each client need not make individual polls to the common host server, to conserve network resources. This approach may be taken for polls occurring at the same time or substantially at the same time, or occurring within a predetermined or customized time interval. The timing interval can range anywhere from 1-10 ms., to seconds, to minutes, hours, or days, weeks, etc. and can depend on the server being polled, the polling application, network conditions (in real time or historical conditions), the network operator, the user behavior/preference, device OS, subscription level (tier of service) with the wireless carrier, sponsorship of a given application service provider/content host, etc.

Figure 7:
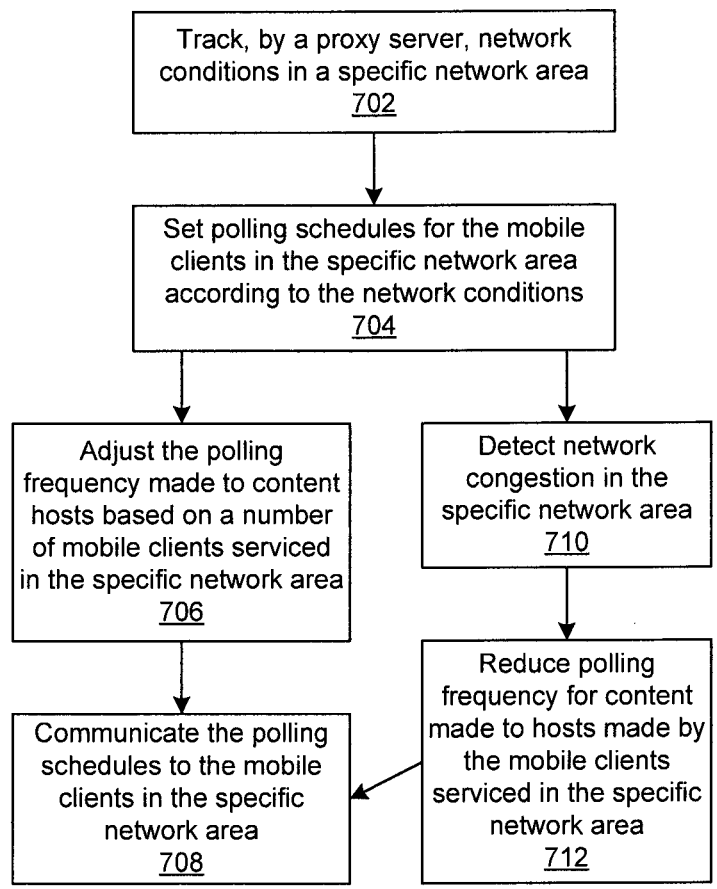
FIG. 7 depicts an example of process for poll schedule management and adjustment for mobile devices in a specific network area based on network conditions and congestion.

FIG. 7 depicts an example of process for poll schedule management and adjustment for mobile devices in a specific network area based on network conditions and congestion.

In process 702, network conditions in a specific network area are tracked (e.g., by the proxy server 325 of the host 300). Information regarding network conditions may also be provided by other parties, including reported by a wireless device user, reported by local proxies on mobile devices, network operators, application/service providers/content hosts, or other third parties.

In process 704, polling schedules are set or specified for the mobile clients or devices in the specific network area according to the network conditions. In one embodiment, the setting the polling schedules includes adjusting the polling frequency made to content hosts. The polling frequency made to the content hosts can be, for example, adjusted by blocking at least some polls from the mobile clients from reaching the wireless network. In process 706, the polling frequency made to content hosts can be adjusted based on a number of mobile clients serviced in the specific network area. The poll frequencies can be specified in poll schedules and can be communicated to the mobile clients in the specific network area, in process 708.

The poll schedules can be received by local proxies on the mobile devices and implemented/managed by the local proxies. Alternatively, the poll schedules may be locally generated by local proxies, based on network information received from the proxy server, or other sources. In one embodiment, the proxy server also adjusts content delivery schedule to the mobile clients from content hosts. For example, in the event of detection of network congestion in process 710 (e.g., either locally or determined from another source), polling frequency for content made to hosts made by the mobile clients serviced in the specific network area can be reduced in process 712. This reduction can be specified in traffic policies specified by the local proxy, the proxy server, or a combination of the two. Network congestion is determined based on reduced data transfer speeds in the wireless network, higher retransmission rates on lower level protocols, and/or failure to connect.

Figure 8:
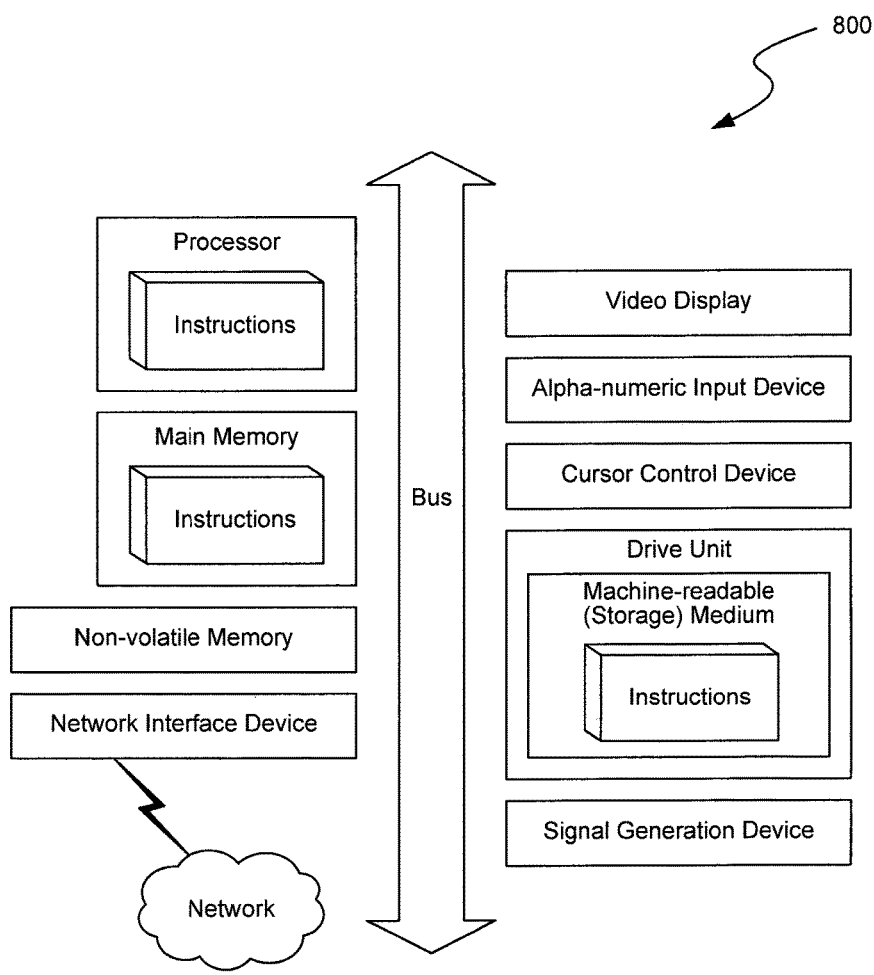
FIG. 8 shows a diagrammatic representation of a machine in the example form of a computer system within which a set of instructions, for causing the machine to perform any one or more of the methodologies discussed herein, may be executed.

FIG. 8 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A method of buffering application data operable at a delivery control server, comprising:
    receiving information, from a mobile device, that identifies applications used by the mobile device;
    receiving a request, from the mobile device, to buffer application data for the identified applications, wherein buffering application data conserves signaling bandwidth;
    receiving, from one or more application servers, an application data transmission for at least one of the identified applications used by the mobile device;
    storing the application data in a buffer as a result of receiving the request;
    receiving an activity notification from the mobile device indicating an opportunity to transmit the application data to the mobile device; and
    transmitting the application data from the buffer to the mobile device in response to receiving the activity notification.

2. The method of claim 1, wherein the request to buffer the application data is adapted to request the delivery control server to buffer a portion of the application data in accordance with a selection criteria.

3. The method of claim 2, wherein the selection criteria comprises delay tolerance of the application data.

4. A method of buffering application data operable at a mobile device, comprising:
    transmitting information that identifies applications used by the mobile device to a delivery control server;
    transmitting a request to buffer application data for the identified applications to the delivery control server, wherein buffering application data conserves signaling bandwidth;
    detecting user activity at the mobile device;
    transmitting an activity notification to the delivery control server upon detecting the user activity at the mobile device; and
    receiving buffered application data for at least one of the identified applications from the deliver control server in response to transmitting the activity notification.

5. The method of claim 4, wherein the detecting of the user activity comprises receiving an output signal from at least one sensor at the mobile device indicating the user activity.

6. The method of claim 5, wherein the at least one sensor comprises at least one of a motion sensor, an accelerometer, a touch sensor, a sound sensor, or a proximity sensor.

7. The method of claim 5, wherein the user activity comprises at least one of touching the mobile device, moving the mobile device, emitting an audible sound in a proximity of the mobile device, or approaching the mobile device.

8. The method of claim 4, wherein the detecting of the user activity comprises predicting imminent user activity.

9. The method of claim 8, wherein the predicting of the imminent user activity comprises detecting application activity at the mobile device indicating the imminent user activity.

10. A method of moderating buffered application data operable at an opportunity notification server, comprising:
   receiving information, from a mobile device, that identifies applications used by the mobile device;
   receiving a request, from the mobile device, to buffer application data for the identified applications, wherein buffering application data conserves signaling bandwidth;
   receiving an activity notification from the mobile device indicating an opportunity to transmit the buffered application data to the mobile device; and
   transmitting an opportunity notification to an application server, responsive to receiving the activity notification, to indicate an opportunity for the application server to transmit the buffered application data to the mobile device.

11. The method of claim 10, wherein the request to buffer the application data is adapted to request the application server to buffer a portion of the application data in accordance with a selection criteria.

12. The method of claim 11, wherein the selection criteria comprises delay tolerance of the application data.

13. A delivery control server for buffering application data, comprising:
   at least one processor;
   a memory coupled to the at least one processor; and
   a communication interface coupled to the at least one processor, wherein the at least one processor is configured to:
      receive information, from a mobile device, that identifies applications used by the mobile device;
      receive a request, from the mobile device, to buffer application data for the identified applications, wherein buffering application data conserves signaling bandwidth;
      receive, from one or more application servers, an application data transmission for at least one of the identified applications used by the mobile device;
      store the application data in the memory;
      receive an activity notification from the mobile device indicating an opportunity to transmit the application data from the memory to the mobile device; and
      transmit the application data from the memory to the mobile device in response to receiving the activity notification.

14. The delivery control server of claim 13, wherein the request to buffer the application data is adapted to request the delivery control server to buffer a portion of the application data in accordance with a selection criteria.

15. The delivery control server of claim 14, wherein the selection criteria comprises delay tolerance of the application data.

16. A mobile device, comprising:
   at least one processor;
   a memory coupled to the at least one processor; and
   a communication interface coupled to the at least one processor, wherein the at least one processor is configured to:
      transmit information that identifies applications used by the mobile device to a delivery control server;
      transmit a request to buffer application data for the identified applications to the delivery control server, wherein buffering application data conserves signaling bandwidth;
      detect user activity;
      transmit an activity notification to the delivery control server upon detecting the user activity; and
      receive the buffered application data for at least one of the identified applications from the deliver control server in response to transmitting the activity notification.

17. The mobile device of claim 16, further comprising at least one sensor coupled to the at least one processor, wherein the at least one processor, being configured to detect the user activity, is further configured to receive an output signal from the at least one sensor indicating the user activity.

18. The mobile device of claim 16, wherein the at least one processor, being configured to detect the user activity, is further configured to predict imminent user activity.

19. The mobile device of claim 18, wherein the at least one processor, being configured to predict the imminent user activity, is further configured to detect application activity at the mobile device indicating the imminent user activity.

20. An opportunity notification server for moderating buffered application data, comprising:
   at least one processor;
   a memory coupled to the at least one processor; and
   a communication interface coupled to the at least one processor, wherein the at least one processor is configured to:
      receive information, from a mobile device, that identifies applications used by the mobile device;
      receive a request, from the mobile device, to buffer application data for the identified applications, wherein buffering application data conserves signaling bandwidth;
      receive an activity notification from the mobile device indicating an opportunity to transmit the buffered application data to the mobile device; and
      transmit an opportunity notification to an application server, responsive to the activity notification, to indicate an opportunity for the application server to transmit the buffered application data to the mobile device.

21. The opportunity notification server of claim 20, wherein the request to buffer the application data is adapted to request the application server to buffer a portion of the application data in accordance with a selection criteria.

22. The opportunity notification server of claim 21, wherein the selection criteria comprises delay tolerance of the application data.

* * * * *